(12) United States Patent
Ferraro et al.

(10) Patent No.: US 11,354,154 B2
(45) Date of Patent: Jun. 7, 2022

(54) TIMER TASK OWNERSHIP DETERMINATION IN A CLUSTER BASED ON A COMMON CLUSTER MEMBER SELECTION ALGORITHM

(71) Applicant: Red Hat, Inc., Raleigh, NC (US)

(72) Inventors: Paul M. Ferraro, Boston, MA (US); Radoslav Husar, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 349 days.

(21) Appl. No.: 16/545,746

(22) Filed: Aug. 20, 2019

(65) Prior Publication Data

US 2021/0055960 A1 Feb. 25, 2021

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/4825* (2013.01); *G06F 9/4856* (2013.01); *G06F 9/4868* (2013.01); *G06F 9/5072* (2013.01); *G06F 2209/483* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 6,345,287 B1 * | 2/2002 | Fong | G06F 8/451 |
| | | | 718/102 |
| 8,219,852 B2 | 7/2012 | Lind et al. | |
| 9,110,719 B2 * | 8/2015 | Hartman | G06F 9/5005 |
| 9,384,103 B2 | 7/2016 | Shinn et al. | |
| 10,346,217 B1 * | 7/2019 | Bray | G06F 9/4881 |
| 2005/0005200 A1 * | 1/2005 | Matena | G06F 9/5072 |
| | | | 714/38.13 |
| 2010/0322256 A1 | 12/2010 | Riley et al. | |

OTHER PUBLICATIONS

Author Unknown, "The Java EE 6 Tutorial," Part No. 821-1841-16, Jan. 2013, Oracle, 1,010 pages.
Satterwhite, Eric, "Exactly Once Execution in a Distributed System," codependent.net/2017/09/04/exactly-once-execution-in-distributed-system, Sep. 4, 2017, 6 pages.

* cited by examiner

*Primary Examiner* — Bing Zhao
(74) *Attorney, Agent, or Firm* — Withrow & Terranova, PLLC

(57) ABSTRACT

Distributed timer task execution management is disclosed. A cluster member generates a first timer task that can be executed on any cluster member of a plurality of cluster members including the first cluster member that composes a cluster. A first timer task schedule that identifies at least one future point in time at which the first timer task is to be executed is generated. A second cluster member of the plurality of cluster members is selected as a cluster member owner for the first timer task that is to schedule the first timer task and to execute the first timer task at the at least one future point in time. The first timer task and the first timer task schedule are transferred to the second cluster member.

18 Claims, 16 Drawing Sheets

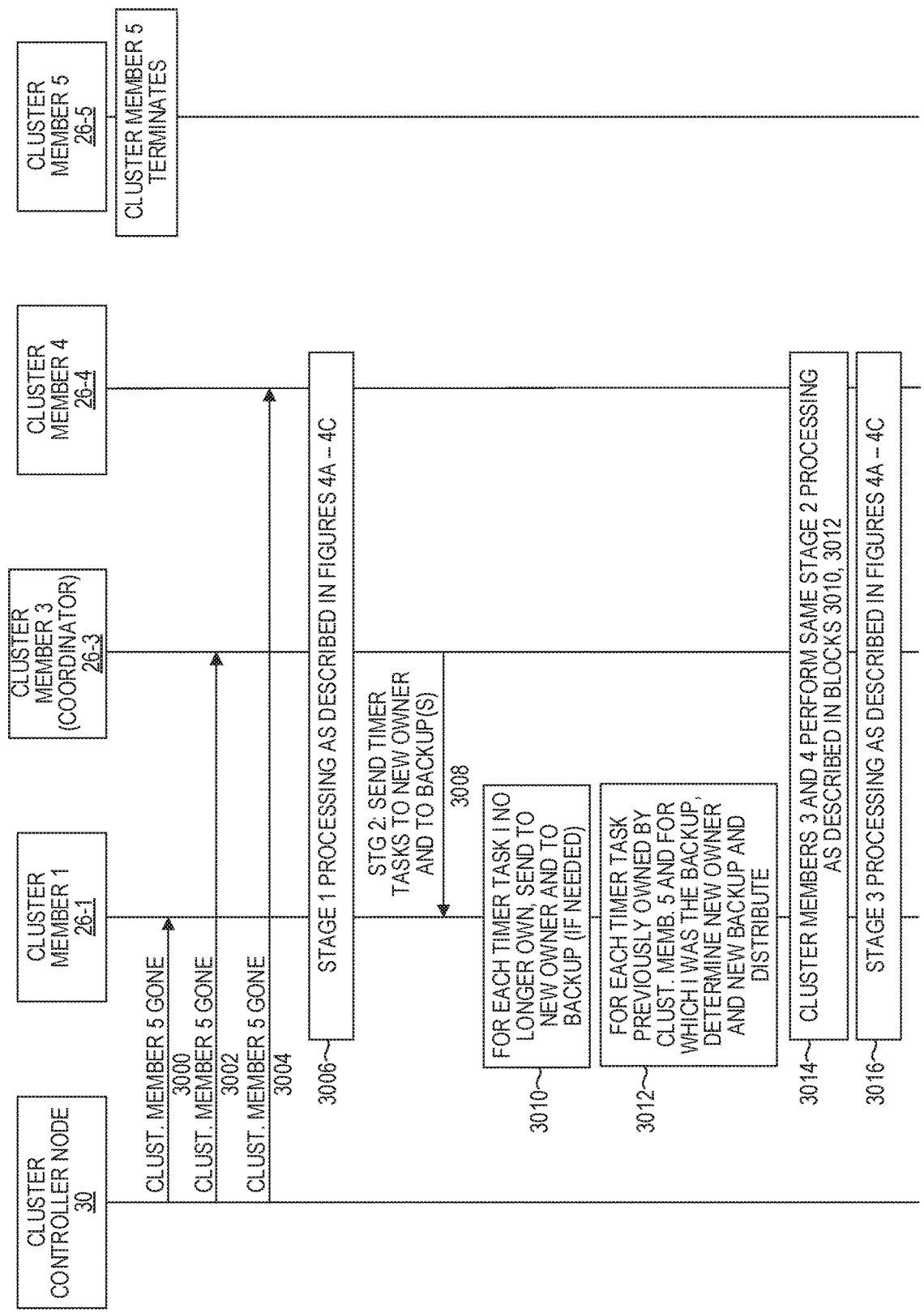

TIMER TASK OWNERSHIP DETERMINATION IN A CLUSTER BASED ON A COMMON CLUSTER MEMBER SELECTION ALGORITHM

BACKGROUND

It is often desirable to schedule tasks for execution at a future point in time. Such tasks may be scheduled to be executed in a cluster environment that includes a plurality of cluster members, such that some tasks may be scheduled to be executed by a particular cluster member and other tasks may be scheduled to be executed by another cluster member.

SUMMARY

The examples disclosed herein implement distributed timer task execution management. A cluster member generates a first timer task that can be executed on any cluster member of a plurality of cluster members. The cluster member generates a first timer task schedule that identifies at least one future point in time at which the first timer task is to be executed. The cluster member selects a second cluster member of the plurality of cluster members as a cluster member owner for the first timer task that is to schedule the first timer task and to execute the first timer task at the at least one future point in time. The cluster member then transfers the first timer task and the first timer task schedule to the second cluster member.

In one example a method is provided. The method includes generating, by a first cluster member executing on a computing device comprising a processor device, a first timer task that can be executed on any cluster member of a plurality of cluster members including the first cluster member that compose a cluster. The method further includes generating a first timer task schedule that identifies at least one future point in time at which the first timer task is to be executed. The method further includes selecting a second cluster member of the plurality of cluster members as a cluster member owner for the first timer task that is to schedule the first timer task and to execute the first timer task at the at least one future point in time. The method further includes transferring the first timer task and the first timer task schedule to the second cluster member.

In another example a computing device is provided. The computing device includes a memory, and a processor device coupled to the memory. The processor device is to generate, by a first cluster member executing on the computing device, a first timer task that can be executed on any cluster member of a plurality of cluster members that compose a cluster. The processor device is further to send the first timer task and a first timer task schedule that identifies at least one future point in time for executing the first timer task to a second cluster member of the plurality of cluster members.

In another example a computer program product is provided. The computer program product is stored on one or more non-transitory computer-readable storage mediums and includes instructions to cause one or more processor devices to generate, by a first cluster member, a first timer task that can be executed on any cluster member of a plurality of cluster members that compose a cluster. The instructions further cause the one or more processor devices to select a second cluster member of the plurality of cluster members based on a selection algorithm that utilizes a first timer task identifier (ID) that uniquely identifies the first timer task, and send the first timer task and a first timer task schedule that identifies at least one future point in time for executing the first timer task to the second cluster member.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 1A-1B are block diagrams of a system suitable for implementing examples disclosed herein;

FIG. 2 is a flowchart of a method for distributed timer task execution management according to one implementation;

FIGS. 3A-3D are block diagrams illustrating redistribution of timer tasks upon a change of cluster membership according to one implementation;

FIGS. 4A-4C are message flow diagrams illustrating a sequence for redistribution of timer tasks after a change of cluster membership wherein a new cluster member joins a cluster according to one implementation;

FIG. 5 is a message flow diagram illustrating a sequence for redistribution of timer tasks after a change of cluster membership wherein an existing cluster member leaves a cluster according to one implementation;

FIG. 6 is a simplified block diagram of the system illustrated in FIGS. 1A-1B according to one example;

FIG. 7 is a block diagram of a compute instance suitable for implementing aspects disclosed herein according to one implementation;

FIG. 8 is a block diagram of a compute instance suitable for implementing aspects disclosed herein according to additional implementations;

FIG. 9 is flowchart of a method for coordinating timer task redistribution among a plurality of cluster members upon a change in cluster membership according to one implementation; and FIG. 10 is a block diagram of a computing device suitable for implementing examples according to one example.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Figure 1A:
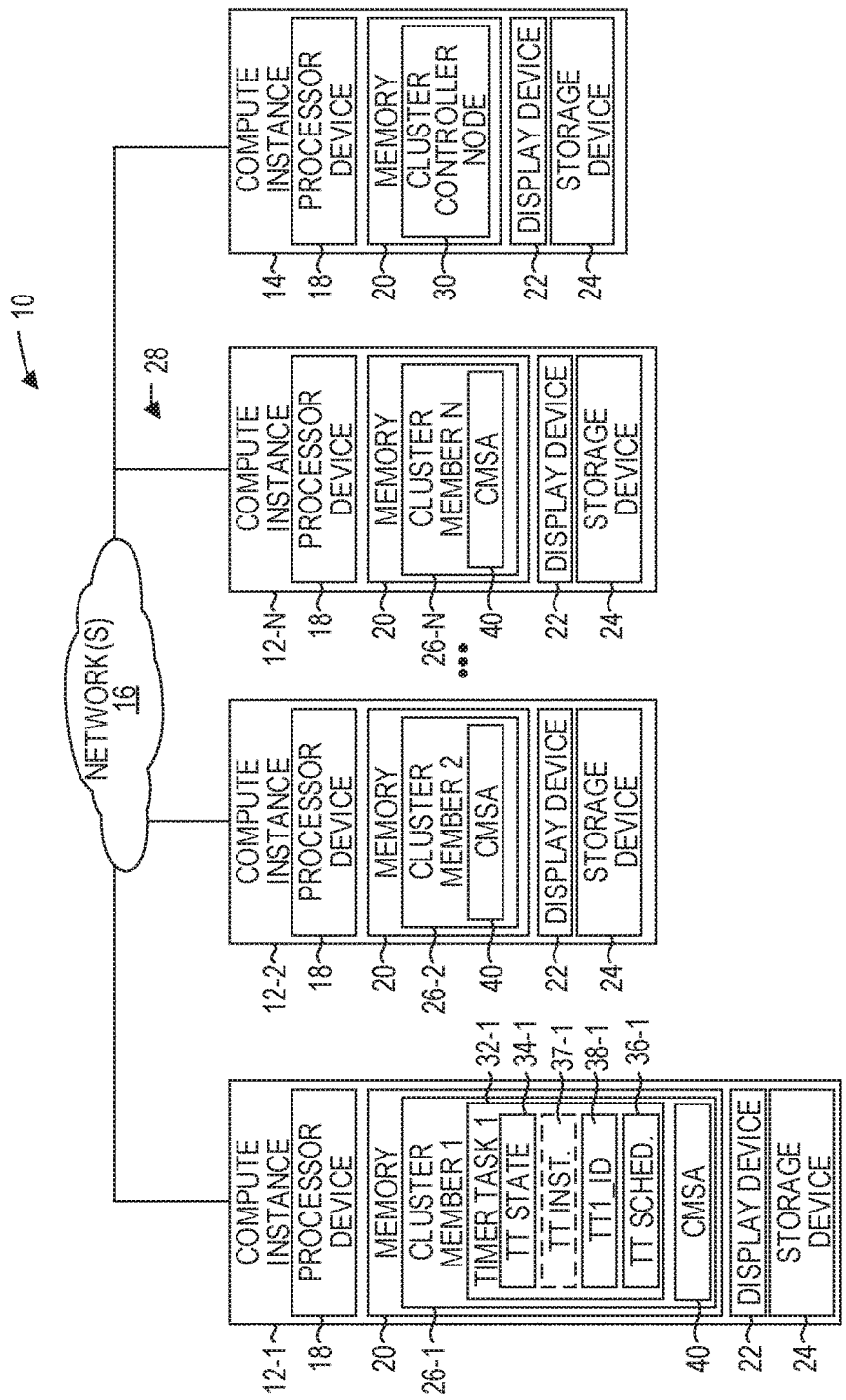

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first timer task” and “second timer task,” and does not imply a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to "one or more" of the element unless otherwise explicitly specified. The word "or" as used herein and in the claims is inclusive unless contextually impossible. As an example, the recitation of A or B means A, or B, or both A and B.

Distributing workloads among a plurality of similarly configured computing entities helps ensure efficient utilization of the computing entities. A clustered environment utilizes multiple different cluster members to process ongoing tasks. It is often desirable to schedule tasks for execution at a future point in time in accordance with a schedule. Such tasks will be referred to herein as timer tasks. A timer task is a task that implements some function at some future point in time. For example, certain business accounting timer tasks may need to be executed each Sunday evening. As another example, it may be desirable to execute a human resource timer task on each anniversary of each employee's start date that recalculates the vacation time allotted to the employee based on years of service. In situations where such timer tasks may take a substantial amount of processing power, and/or where there are a relatively large number of timer tasks, it may be desirable to distribute such timer tasks among all the cluster members.

Cluster membership can change arbitrarily. A member may be added to a cluster during times of heavy demand, and a member may be shut down during times of lower demand. A cluster member may terminate unexpectedly due to a software or hardware error. Cluster members that terminate may own one or more timer tasks that should be executed even after the cluster member has terminated. When a new cluster member arrives, it may be desirable to redistribute all the timer tasks to more evenly distribute the timer tasks among the new number of cluster members.

The examples disclosed herein implement distributed timer task execution management. A cluster member generates a first timer task that can be executed on any cluster member of a plurality of cluster members. The cluster member generates a first timer task schedule that identifies at least one future point in time at which the first timer task is to be executed. The cluster member selects a second cluster member of the plurality of cluster members as a cluster member owner for the first timer task that is to schedule the first timer task and to execute the first timer task at the at least one future point in time. The cluster member then transfers the first timer task and the first timer task schedule to the second cluster member.

In some examples, the selection of a cluster member owner is based on a cluster member selection algorithm that identifies, based on a timer task identifier (ID) and a given cluster membership, a consistent cluster member owner for the timer task identified by the timer task identifier. Any cluster member, given the timer task ID, can utilize the cluster member selection algorithm to determine the current cluster member owner of the timer task. The cluster member selection algorithm is configured to, given different timer task IDs, identify different cluster members as cluster member owners in a manner that relatively evenly distributes cluster member ownership of timer tasks among the existing cluster members of a cluster. Upon a change of cluster membership, such as the addition or removal of a cluster member, the cluster member selection algorithm automatically changes such that given the new cluster membership and a timer task ID, the cluster member selection algorithm identifies a consistent cluster member owner for the timer task ID in conjunction with relatively even distribution of cluster member ownership of timer tasks among the existing cluster members of the new cluster membership.

The examples herein also implement mechanisms for reevaluation of cluster member ownership of existing timer tasks upon a change in cluster membership, to ensure timer tasks are redistributed evenly among the cluster members given the new cluster membership, and to ensure that timer tasks that were previously owned by a cluster member that no longer exists are distributed to other cluster members.

FIG. 1A is a block diagram of a system 10 suitable for implementing examples disclosed herein. The system 10 includes a plurality of compute instances 12-1, 12-2-12-N (generally, compute instances 12) and a compute instance 14 communicatively coupled via a network 16. A compute instance 12, 14 as discussed herein, refers to a discrete runtime environment, and may comprise a physical machine configured to run an operating system, or may comprise a virtual machine that emulates a physical machine. A virtual machine typically runs a guest operating system in conjunction with a virtual machine monitor, such as a hypervisor, that is configured to coordinate access to physical resources of a physical machine, such as a memory and a processor device, by the virtual machines running on the physical machine. A compute instance 12, 14 thus, whether a physical machine or a virtual machine, includes a memory and a processor device. While for purposes of illustration three compute instances 12 are illustrated, the system 10 may in practice have tens, hundreds, or thousands of compute instances 12.

Each compute instance 12, 14 includes a processor device 18 coupled to a memory 20. The compute instances 12, 14 may also include a display device 22, and include, or be communicatively coupled to, a storage device 24. Executing on the compute instances 12 are a plurality of cluster members 26-1-26-N (generally cluster members 26) that form a cluster 28. The examples may be implemented in any desired clustering environment, and the cluster members 26 may comprise any suitable cluster processes depending on the clustering environment utilized. While for purposes of illustration FIG. 1A illustrates each cluster member 26 as executing on a separate compute instance 12, in other implementations a single compute instance 12 may include multiple cluster members 26, and indeed, all cluster members 26 may be implemented on a single compute instance 12. In some implementations, the examples disclosed herein are implemented in a Java Enterprise Edition (Java EE) environment and utilize Red Hat OpenStack clustering technology, and the cluster members 26 may be Java bean containers, but the examples are not limited to any particular clustering technology. For purposes of illustration and simplicity, functionality may be attributed herein to one or more of the cluster members 26, but it should be appreciated that such functionality may be implemented by one or more computing processes executing within the cluster members 26. Such computing processes are inherently part of the cluster member 26 in which they operate, and thus functionality implemented by any computing processes within any cluster member 26 may be attributed to the cluster member 26 itself.

Moreover, because a cluster member 26 is a component of a compute instance 12, functionality implemented by any cluster member 26 may be attributed to the compute instance 12 generally. Moreover, in examples where the cluster member 26 comprises software instructions that program a processor device 18 to carry out functionality discussed herein, functionality implemented by the cluster member 26 may be attributed herein to the processor device 18.

In some implementations, the cluster members 26 may be managed and/or controlled by a component such as a cluster controller node 30. The cluster controller node 30 may be responsible for initiating the cluster members 26, terminating the cluster members 26, distributing a workload among the cluster members 26, and/or providing centralized services to the cluster members 26. The cluster controller node 30 may also monitor and keep track of changes in cluster membership, such as being aware of when a cluster member 26 has left the cluster 28, either via request or unexpectedly due to a software or hardware failure, and being aware of the addition of a new cluster member 26 to the cluster 28. While for purposes of illustration the cluster controller node 30 is illustrated as being separate from the cluster members 26, in some clustering technologies the cluster controller node 30 may be implemented by one of the cluster members 26.

In this example, the cluster member 26-1 generates a timer task 32-1 that can be executed on any cluster member 26. The timer task 32-1 implements some desired functionality when executed at a scheduled future point in time, or at multiple future points in time. For example, the timer task 32-1 may perform a particular business accounting function, and may be scheduled to perform such business accounting function each Sunday evening at 10:00 PM. As another example, the timer task 32-1 may recalculate vacation time allotted to a particular employee based on years of service, and may be scheduled to execute on each anniversary date of the employee's start date. In the latter example, the cluster member 26-1 may generate a timer task 32-1 for each employee of a company, and thus hundreds or thousands of such timer tasks 32-1 may be generated and scheduled to run at future points in time.

The phrase "generate" in the context of generating the timer task 32-1 refers to generating information that is used to cause some functionality to occur at one or more future points in time. The exact information generated may differ depending on the programmatic environment of the system 10. In an object-oriented environment, such as a Java Bean environment, where an object can be instantiated on demand to perform some task, the generation of the timer task 32-1 may include the generation of a timer task state 34-1 (hereinafter "state" for purposes of brevity), which comprises metadata or data used by the timer task 32-1 during execution at the future point in time to implement the desired functionality. The metadata, for example, could identify a particular employee, or a particular file that is modified, or a particular file system to be condensed, or any other metadata or data that the timer task 32-1, during execution, needs to properly execute. The particular metadata or data differs depending on the function of the particular timer task.

The generation of the timer task 32-1 also includes the generation of a timer task schedule 36-1 (hereinafter "schedule" for purposes of brevity). The schedule 36-1 identifies at least one future point in time that the timer task 32-1 is to be executed. The generation of the timer task 32-1 also includes the generation of a timer task identifier (ID) 38-1 that uniquely identifies the timer task 32-1. In some embodiments the cluster member 26-1 may invoke some system function that provides, upon request, a unique ID, or may obtain the timer task ID 38-1 via any other mechanism by which a unique ID may be obtained.

The timer task 32-1 includes timer task instructions 37-1. The timer task instructions 37-1 may comprise, for example, an object-oriented class from which an object can be instantiated at the scheduled time to perform the desired function. In some implementations, the cluster members 26 may have different timer task classes, in which case the timer task instructions 37-1 may be transferred along with the state 34-1, the timer task ID 38-1 and the timer task schedule 36-1 when the timer task 32-1 is transferred from one cluster member 26 to another cluster member 26. In other implementations, each cluster member 26 may have the same set of timer task classes, in which case the timer task instructions 37-1 need not be transferred along with the rest of the timer task 32-1. In such implementations, the timer task 32-1 may identify the appropriate timer task class to utilize at the scheduled time, via, for example, the state 34-1 or via other information that identifies the appropriate timer task class.

The cluster member 26-1 utilizes a cluster member selection algorithm (CMSA) 40 to, based on the timer task ID 38-1 and on the current set of cluster members 26, select a cluster member 26 of the plurality of cluster members 26 as a cluster member owner for the timer task 32-1 that is to schedule the timer task 32-1 and execute the timer task 32-1 at the at least one future point in time in accordance with the schedule 36-1.

The CMSA 40 comprises any suitable algorithm that, given a particular set of cluster members 26 in the cluster 28, selects a cluster member 26 to be a cluster member owner of the timer task 32-1 based on the value of the timer task ID 38-1. The CMSA 40 is consistent, in that as long as the cluster membership of the cluster 28 remains the same, the CMSA 40 will, if provided the timer task ID 38-1 and the same set of cluster member IDs, consistently select the same cluster member 26 as being the cluster member owner of the timer task 32-1. The cluster members 26-2-26-N contain, or have access to, identical CMSAs 40 that operate identically, and that, given the same timer task ID 38-1, will identify the same cluster member 26 as being the cluster member owner of the timer task 32-1. Thus, given the timer task ID 38-1, any cluster member 26 can determine the cluster member owner of the timer task 32-1. While for purposes of illustration multiple CMSAs 40 are illustrated, in practice, there may be a single CMSA 40 which may be invoked by any cluster member 26 as desired.

If cluster membership changes, such as a decrease in the number of cluster members 26 or an increase in the number of cluster members 26, the CMSA 40 takes into account the new cluster membership to select a cluster member 26 to be a cluster member owner of a timer task 32 given a particular timer task ID 38. However, the cluster member owner of the same timer task 32 may change upon a change of cluster membership. Thus, as will be discussed below, upon cluster membership changing, each cluster member 26 may utilize the CMSA 40 to reevaluate ownership of any timer task 32 owned by the respective cluster member 26 and determine whether ownership has changed, and if so, take appropriate action.

In one implementation, the CMSA 40 comprises a hashing algorithm that utilizes a hash wheel to determine a cluster member owner given the timer task ID 38-1. The hash wheel includes a plurality of entries, each of which corresponds to one of the cluster members 26. The cluster members 26 may, for example, be randomly distributed about the hash wheel. The CMSA 40 hashes the timer task ID 38-1 (in this example) to generate an index. The index identifies a particular entry on the hash wheel. The cluster member 26 corresponding to that entry is identified as the cluster member owner for the timer task 32-1. In some implementations the CMSA 40 may also be configured to identify a different cluster member 26 as a cluster member backup for the timer task 32-1. In particular, in one implementation, after selecting the cluster member owner for the timer task 32-1, the CMSA 40 may proceed clockwise around the hash wheel and select the next entry, and identify the cluster member 26 corresponding to that entry as the cluster member backup for the timer task 32-1. In other implementations the CMSA 40 may be configured to identify multiple cluster members as cluster member backups for a timer task.

The CMSA 40 receives as input a timer task ID 38 and the cluster member IDs of the particular cluster for which it is desired to determine the cluster member owner or cluster member backup. This allows a cluster member 26 to determine the cluster member owner or cluster member backup of either a current cluster or a previous cluster. For example, after cluster membership changes, a cluster member 26 may invoke the CMSA 40 with a particular timer task ID 38 and the cluster member IDs of the previous cluster, prior to the cluster membership change, to determine the previous cluster member owner or cluster member backup for the timer task 32.

In this example, it will be assumed that, given the timer task ID 38-1, the CMSA 40 identifies the cluster member 26-2 as the cluster member owner of the timer task 32-1 and the cluster member 26-N as the cluster member backup of the timer task 32-1. A cluster member owner of the timer task 32-1 is the sole cluster member 26 that is to schedule the timer task 32-1 for execution in accordance with the schedule 36-1. A cluster member backup of the timer task 32-1 stores the timer task 32-1 but does not schedule the timer task 32-1 for execution. The cluster member 26-1 transfers the timer task 32-1 to the cluster member 26-2 as the cluster member owner of the timer task 32-1 and to the cluster member 26-N as the cluster member backup of the timer task 32-1.

Figure 1B:
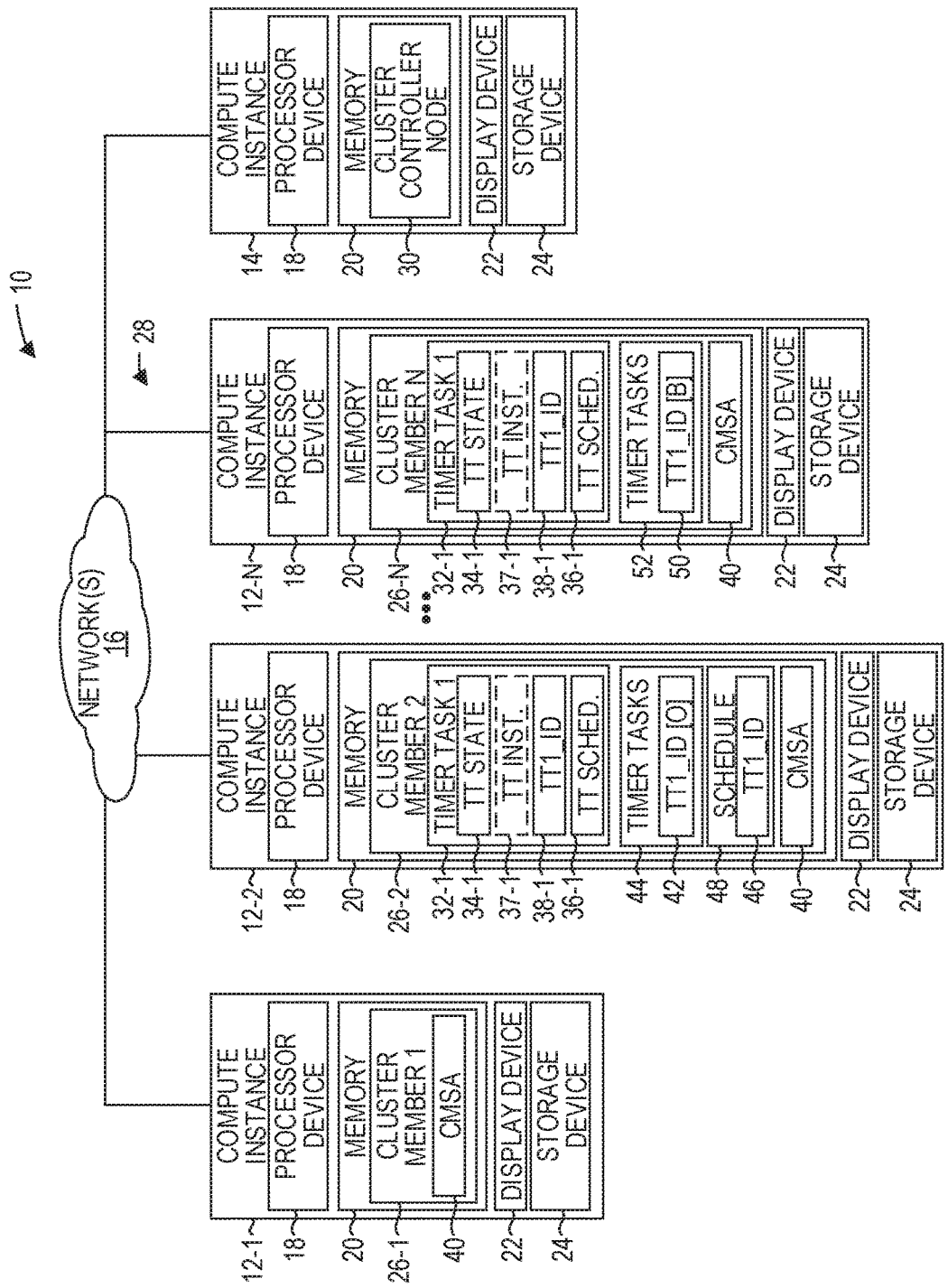

Referring now to FIG. 1B, the cluster member 26-2 receives the timer task 32-1. The cluster member 26-2 determines that the cluster member 26-2 is the cluster member owner of the timer task 32-1. The cluster member 26-2 may make this determination in any of a number of different ways. In one implementation, the cluster member 26-1 may transfer the timer task 32-1 to the cluster member 26-2 along with information indicating that the cluster member 26-2 is the cluster member owner of the timer task 32-1. In another implementation, the cluster member 26-2 may access the timer task ID 38-1 and provide the timer task ID 38-1 to the CMSA 40. Because cluster membership has not changed, the CMSA 40 identifies the cluster member 26-2 as being the cluster member owner of the timer task 32-1.

The cluster member 26-2 generates a timer task list entry 42 in a timer task list 44 that monitors and keeps track of the timer tasks 32 for which the cluster member 26-2 is a cluster member owner or a cluster member backup. The timer task list entry 42, in this example, contains a copy of the timer task ID 38-1, and a designation "[O]" that indicates that the cluster member 26-2 is the cluster member owner of the timer task 32-1. The cluster member 26-2 then schedules the timer task 32-1 for execution by the cluster member 26-2 in accordance with the schedule 36-1, as indicated by a schedule entry 46 in a schedule 48.

The cluster member 26-N also receives the timer task 32-1. The cluster member 26-N determines that the cluster member 26-N is the cluster member backup of the timer task 32-1. The cluster member 26-N may make this determination in any of a number of different ways. In one implementation, the cluster member 26-1 may transfer the timer task 32-1 to the cluster member 26-N along with information indicating that the cluster member 26-2 is the cluster member backup of the timer task 32-1. In another implementation, the cluster member 26-N may access the timer task ID 38-1 and provide the timer task ID 38-1 to the CMSA 40. Because cluster membership has not changed, the CMSA 40 identifies the cluster member 26-N as being the cluster member backup of the timer task 32-1.

The cluster member 26-N generates a timer task list entry 50 in a timer task list 52 that maintains track of the timer tasks 32 for which the cluster member 26-N is a cluster member owner or a cluster member backup. The timer task list entry 50, in this example, contains a copy of the timer task ID 38-1, and a designation "[B]" that indicates that the cluster member 26-N is the cluster member backup of the timer task 32-1. Because the cluster member 26-N is not the cluster member owner of the timer task 32-1, the cluster member 26-N does not schedule the timer task 32-1 for execution.

Figure 2:
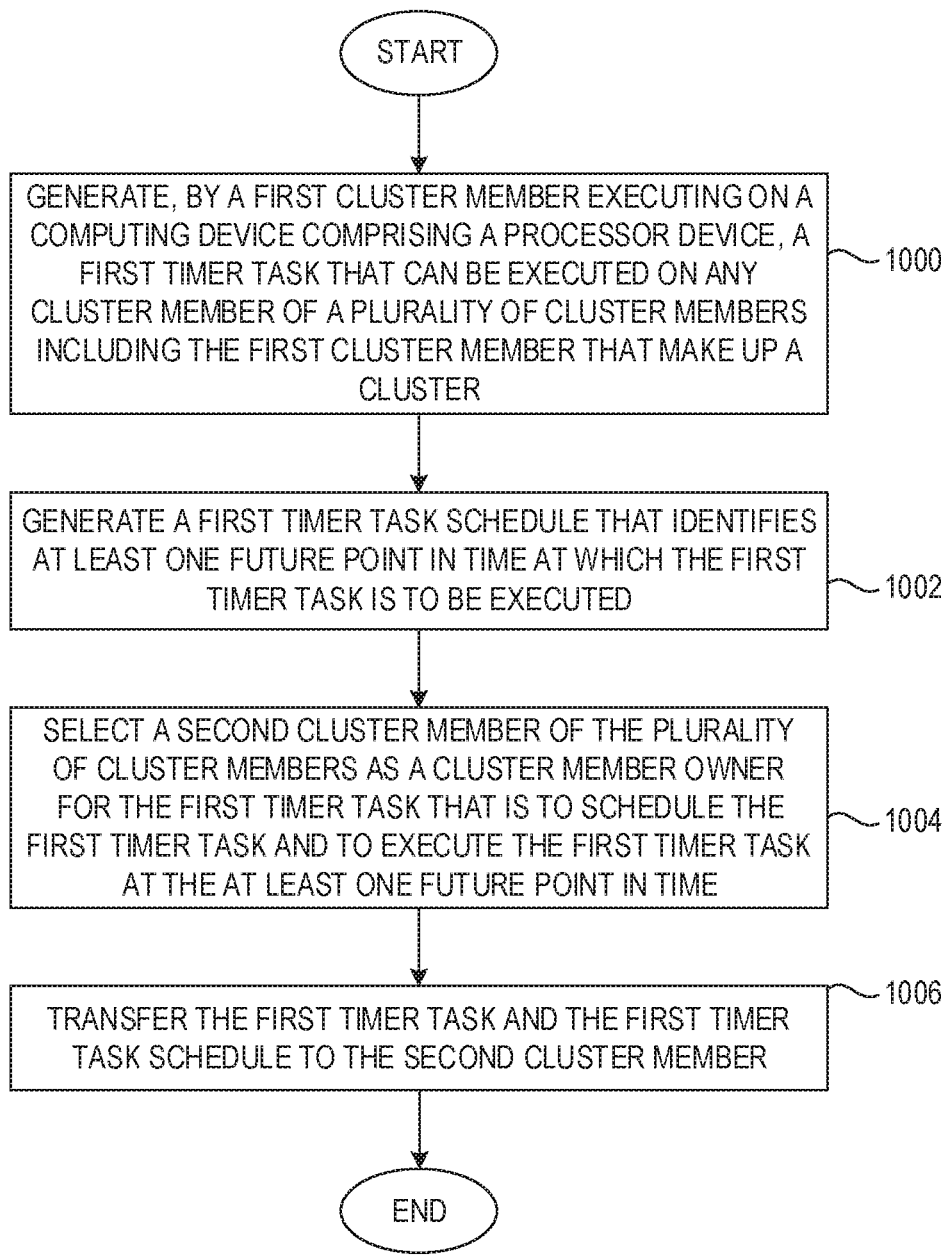

FIG. 2 is a flowchart of a method for distributed timer task execution management according to one implementation. FIG. 2 will be discussed in conjunction with FIGS. 1A and 1B. The cluster member 26-1 generates the timer task 32-1 that can be executed on any cluster member 26 of the plurality of cluster members 26 that compose the cluster 28 (FIG. 2, block 1000). The cluster member 26-1 generates the timer task schedule 36-1 that identifies at least one future point in time at which the timer task 32-1 is to be executed (FIG. 2, block 1002). The cluster member 26-1 selects the cluster member 26-2 of the plurality of cluster members 26 as the cluster member owner for the timer task 32-1 that is to schedule the timer task 32-1 and to execute the timer task 32-1 at the at least one future point in time (FIG. 2, block 1004). The cluster member 26-1 transfers the timer task 32-1 and the timer task schedule 36-1 to the cluster member 26-2 (FIG. 2, block 1006). In this manner, timer tasks 32 generated by the cluster members 26 can be evenly distributed among all the cluster members 26 for execution.

FIGS. 3A-3D are block diagrams illustrating redistribution of timer tasks 32 upon a change of cluster membership according to one implementation. Note that solely for purposes of simplicity and illustration many of the components illustrated in FIGS. 1A-1B have been omitted, such as the memories, processor devices, display devices and storage devices, but in practice the compute instances 12-1-12-4 do have memories and processor devices, and may have display devices and storage devices. Moreover, note that the timer tasks 32-1-32-4 do not explicitly illustrate separate timer task states and timer task schedules, but each of the timer tasks 32-1-32-4 have a corresponding timer task state and timer task schedule as discussed above with regard to FIGS. 1A-1B.

Figure 3A:
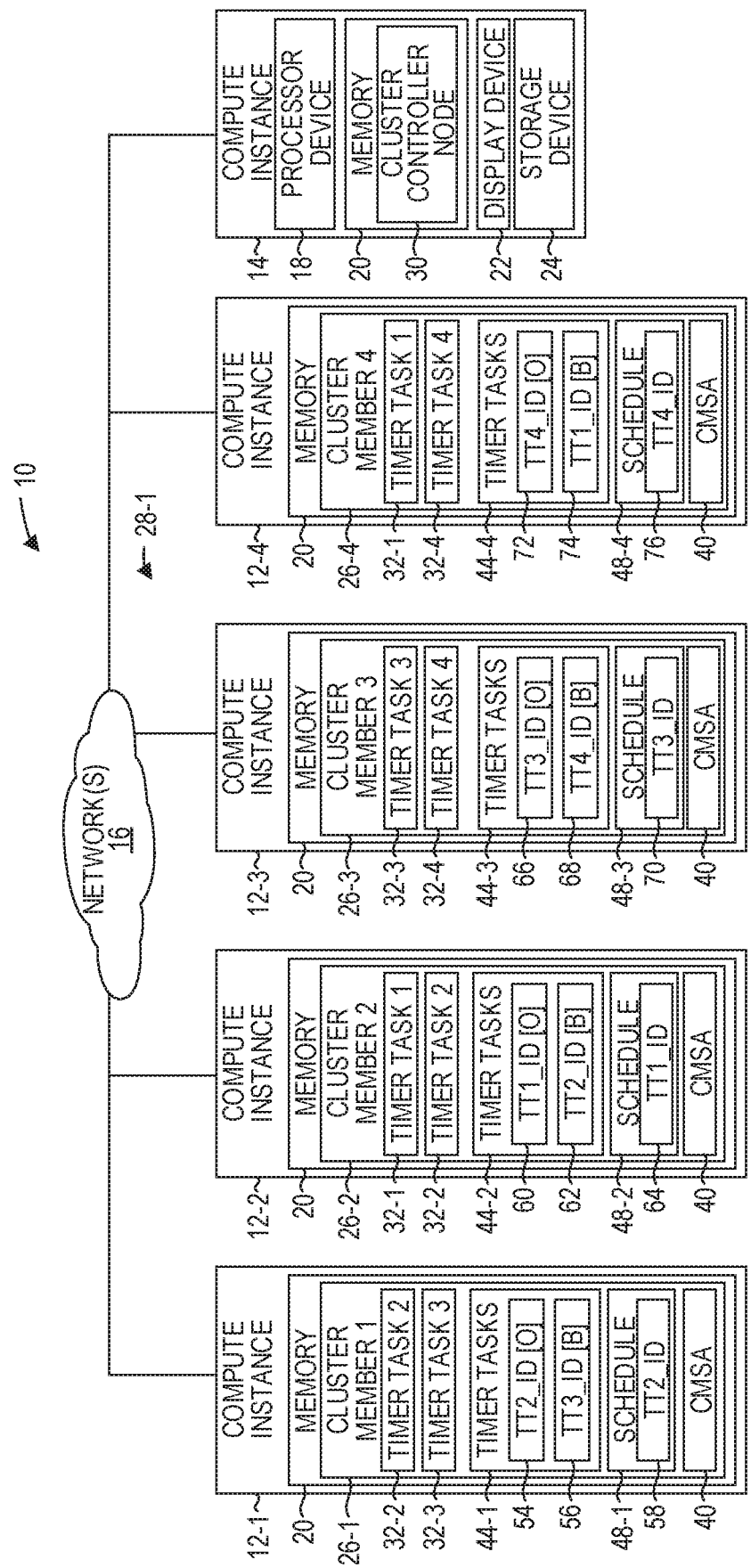

Referring first to FIG. 3A, the system 10 has a cluster 28-1 made up of four cluster members 26-1-26-4. Four timer tasks 32-1-32-4 have been generated and transferred to various cluster members 26 for execution and for backup in accordance with the processes discussed above with regard to FIGS. 1A-1B. The cluster member 26-1 is a cluster member owner for a timer task 32-2 and a cluster member backup for a timer task 32-3, as noted by entries 54 and 56, respectively, of a timer task list 44-1. As the cluster member owner for the timer task 32-2, the cluster member 26-1 has scheduled the timer task 32-2 for execution in accordance with a corresponding schedule, as indicated by a schedule entry 58 of a schedule 48-1. Note that the timer task 32-3 is not scheduled to be executed by the cluster member 26-1.

The cluster member 26-2 is a cluster member owner for the timer task 32-1 and a cluster member backup for the timer task 32-2, as noted by entries 60 and 62, respectively, of a timer task list 44-2. As the cluster member owner for the timer task 32-1, the cluster member 26-2 has scheduled the timer task 32-1 for execution in accordance with a corresponding schedule, as indicated by a schedule entry 64 of a schedule 48-2. Note that the timer task 32-2 is not scheduled to be executed by the cluster member 26-2.

The cluster member 26-3 is a cluster member owner for the timer task 32-3 and a cluster member backup for a timer task 32-4, as noted by entries 66 and 68, respectively, of a timer task list 44-3. As the cluster member owner for the timer task 32-3, the cluster member 26-3 has scheduled the timer task 32-3 for execution in accordance with a corresponding schedule, as indicated by a schedule entry 70 of a schedule 48-3. Note that the timer task 32-4 is not scheduled to be executed by the cluster member 26-3.

The cluster member 26-4 is a cluster member owner for the timer task 32-4 and a cluster member backup for the timer task 32-1, as noted by entries 72 and 74, respectively, of a timer task list 44-4. As the cluster member owner for the timer task 32-4, the cluster member 26-4 has scheduled the timer task 32-4 for execution in accordance with a corresponding schedule, as indicated by a schedule entry 76 of a schedule 48-4. Note that the timer task 32-1 is not scheduled to be executed by the cluster member 26-4.

Figure 3B:
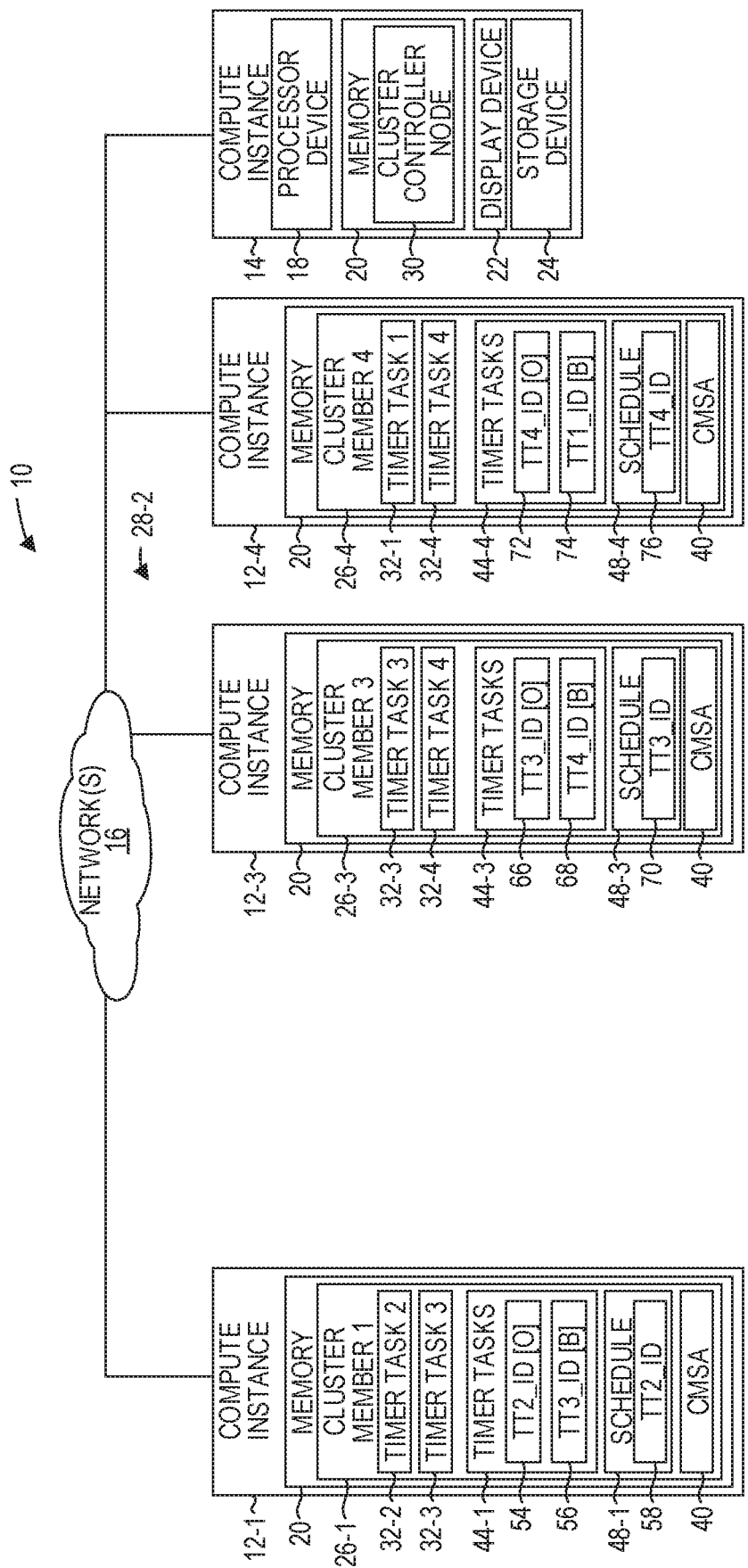

Referring now to FIG. 3B, the compute instance 12-2 faulted, and thus the cluster member 26-2 has left the cluster 28-1, resulting in a cluster 28-2 that includes the cluster members 26-1, 26-3 and 26-4. Upon the change in cluster membership, the respective cluster members 26-1, 26-3 and 26-4 reevaluate the cluster member owner and the cluster member backup for each timer task 32 for which the respective cluster members 26-1, 26-3 and 26-4 are cluster member owners or cluster member backups.

Figure 3C:
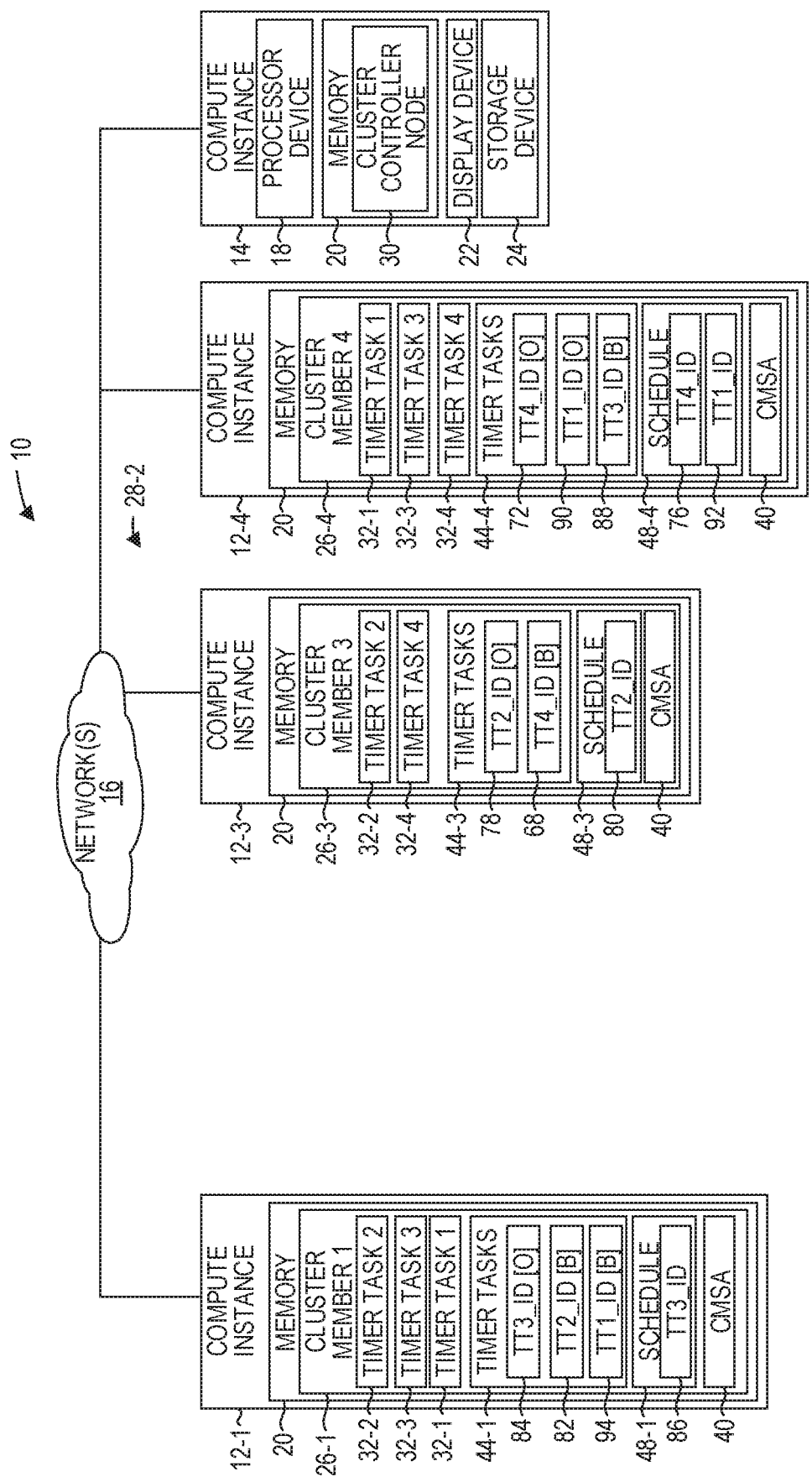

Referring now to both FIGS. 3B and 3C, the cluster member 26-1 accesses the timer task ID that corresponds to the timer task 32-2 and invokes the CMSA 40 to determine the cluster member owner and the cluster member backup for the timer task 32-2 after the change in cluster membership. As noted above, because cluster membership has changed, the CMSA 40 uses the cluster member IDs of the cluster members 26 in the new cluster to determine ownership, which may result in different cluster member owners and cluster member backups for one or more of the timer tasks 32. The CMSA 40 hashes the timer task ID that corresponds to the timer task 32-2 and determines that the cluster member owner for the timer task 32-2 is now the cluster member 26-3 and the cluster member backup for the timer task 32-2 is now the cluster member 26-1. The cluster member 26-1 unschedules the timer task 32-2 so that the timer task 32-2 will not be executed by the cluster member 26-1, and sends the timer task 32-2 to the cluster member 26-3.

The cluster member 26-3 receives the timer task 32-2. The cluster member 26-3 determines that the cluster member 26-3 is the cluster member owner for the timer task 32-2. This determination may be made, for example, by information sent by the cluster member 26-1, or by processing the timer task ID of the timer task 32-2 with the CMSA 40. The cluster member 26-3 generates an entry 78 (FIG. 3C) in the timer task list 44-3 that identifies the timer task 32-2, and that indicates that the cluster member 26-3 is the cluster member owner of the timer task 32-2. The cluster member 26-3 also, as the cluster member owner of the timer task 32-2, schedules the timer task 32-2 for execution in accordance with the corresponding schedule, as indicated by a schedule entry 80 in the schedule 48-3.

Because the cluster member 26-1 already was the cluster member backup for the timer task 32-2, the cluster member 26-1 already has the timer task 32-2. The cluster member 26-1 removes the entry 54 from the timer task list 44-1 that indicated that the timer task 32-2 was owned by the cluster member 26-1, and adds a new entry 82 (FIG. 3C) that identifies the timer task 32-2, and that indicates that the cluster member 26-1 is now the cluster member backup of the timer task 32-2.

The cluster member 26-1 accesses the timer task ID that corresponds to the timer task 32-3 and invokes the CMSA 40 to determine the cluster member owner and the cluster member backup for the timer task 32-3 after the change in cluster membership. The CMSA 40 hashes the timer task ID that corresponds to the timer task 32-3 and determines that the cluster member owner for the timer task 32-3 is now the cluster member 26-1 and the cluster member backup for the timer task 32-3 is now the cluster member 26-4.

Because the cluster member 26-1 already was the cluster member backup for the timer task 32-3, the cluster member 26-1 already has the timer task 32-3. The cluster member 26-1 removes the entry 56 from the timer task list 44-1 that indicated that the cluster member 26-1 was the cluster member backup for the timer task 32-3, and adds a new entry 84 (FIG. 3C) that identifies the timer task 32-3, and that indicates that the cluster member 26-1 is now the cluster member owner of the timer task 32-3. The cluster member 26-1 also, as the cluster member owner of the timer task 32-3, schedules the timer task 32-3 for execution in accordance with the corresponding schedule, as indicated by a schedule entry 86 in the schedule 48-1. The cluster member 26-1 has now completed processing for reevaluating ownership of the timer tasks 32-2, 32-3 for which the cluster member 26-1 was a cluster member owner or a cluster member backup prior to the change in cluster membership.

The cluster member 26-3 accesses the timer task ID that corresponds to the timer task 32-3 and invokes the CMSA 40 to determine the cluster member owner and the cluster member backup for the timer task 32-3 after the change in cluster membership. The CMSA 40 hashes the timer task ID that corresponds to the timer task 32-3 and determines that the cluster member owner for the timer task 32-3 is now the cluster member 26-1 and the cluster member backup for the timer task 32-3 is now the cluster member 26-4. The cluster member 26-3 unschedules the timer task 32-3 so that the timer task 32-3 will not be executed by the cluster member 26-3. The cluster member 26-3 can invoke the CMSA 40 with the timer task ID that corresponds to the timer task 32-3 and the previous cluster member IDs, and thereby determine that the cluster member 26-1 was previously the cluster member backup for the timer task 32-3, and thus determine that the cluster member 26-3 need not send the timer task 32-3 to the cluster member 26-1. Moreover, because each of the cluster members 26-1, 26-3 and 26-4 will reevaluate ownership, the cluster member 26-1, as discussed previously, will similarly reevaluate ownership of the timer task 32-3 as the former cluster member backup for the timer task 32-3, and, as described above, determine that the cluster member 26-1 is now the cluster member owner for the timer task 32-3, and will take the appropriate steps, as described above. Thus, the cluster member 26-3 sends the timer task 32-3 only to the cluster member 26-4.

The cluster member 26-4 receives the timer task 32-3. The cluster member 26-4 determines that the cluster member 26-4 is the cluster member backup for the timer task 32-3. This determination may be made, for example, by processing the timer task ID of the timer task 32-3 with the CMSA 40. The cluster member 26-4 generates an entry 88 in the timer task list 44-4 that identifies the timer task 32-3, and that indicates that the cluster member 26-4 is the cluster member backup of the timer task 32-3. The cluster member 26-4 also, as the cluster member backup of the timer task 32-3, does not schedule the timer task 32-3 for execution in accordance with the corresponding schedule.

The cluster member 26-3 accesses the timer task ID that corresponds to the timer task 32-4 and invokes the CMSA 40 to determine the cluster member owner and the cluster member backup for the timer task 32-4 after the change in cluster membership. The CMSA 40 hashes the timer task ID that corresponds to the timer task 32-4 and determines that the cluster member owner for the timer task 32-4 is still the cluster member 26-4 and the cluster member backup for the timer task 32-4 remains the cluster member 26-3. Because the cluster member 26-3 was previously the cluster member backup for the timer task 32-4, the cluster member 26-3 need not make any changes to the entry 68 in the timer task list 44-3. Because the cluster member 26-4 was previously the cluster member owner the timer task 32-4, the cluster member 26-3 need not send the timer task 32-4 to the cluster member 26-4.

The cluster member 26-4 accesses the timer task ID that corresponds to the timer task 32-1 and invokes the CMSA 40 to determine the cluster member owner and the cluster member backup for the timer task 32-1 after the change in cluster membership. The CMSA 40 hashes the timer task ID that corresponds to the timer task 32-1 and determines that the cluster member owner for the timer task 32-1 is now the cluster member 26-4 and the cluster member backup for the timer task 32-1 is now the cluster member 26-1. The cluster member 26-4 was previously the cluster member backup for the timer task 32-1 and is now the cluster member owner for the timer task 32-1. The cluster member 26-4 removes the entry 74 from the timer task list 44-4 and adds a new entry 90 that identifies the timer task 32-1, and that indicates that the cluster member 26-4 is now the cluster member owner of the timer task 32-1. The cluster member 26-4 also, as the cluster member owner of the timer task 32-1, schedules the timer task 32-1 for execution in accordance with the corresponding schedule, as indicated by a schedule entry 92 in the schedule 48-4. The cluster member 26-4 also sends the timer task 32-1 to the cluster member 26-1.

The cluster member 26-1 receives the timer task 32-1. The cluster member 26-1 determines that the cluster member 26-1 is the cluster member backup for the timer task 32-1. This determination may be made, for example, by processing the timer task ID of the timer task 32-1 with the CMSA 40. The cluster member 26-1 generates an entry 94 in the timer task list 44-1 that identifies the timer task 32-1, and that indicates that the cluster member 26-1 is the cluster member backup of the timer task 32-1. The cluster member 26-1 also, as the cluster member backup of the timer task 32-1, does not schedule the timer task 32-1 for execution in accordance with the corresponding schedule.

The cluster member 26-4 accesses the timer task ID that corresponds to the timer task 32-4 and invokes the CMSA 40 to determine the cluster member owner and the cluster member backup for the timer task 32-4 after the change in cluster membership. The CMSA 40 hashes the timer task ID that corresponds to the timer task 32-4 and determines that the cluster member owner for the timer task 32-4 is still the cluster member 26-4 and the cluster member backup for the timer task 32-4 is still the cluster member 26-3. The cluster member 26-4 thus need not do any additional processing with regard to the timer task 32-4.

FIG. 3C reflects the state of the cluster 28-2 after the reevaluation of timer task ownership and redistribution of timer tasks among the new cluster membership.

Figure 3D:
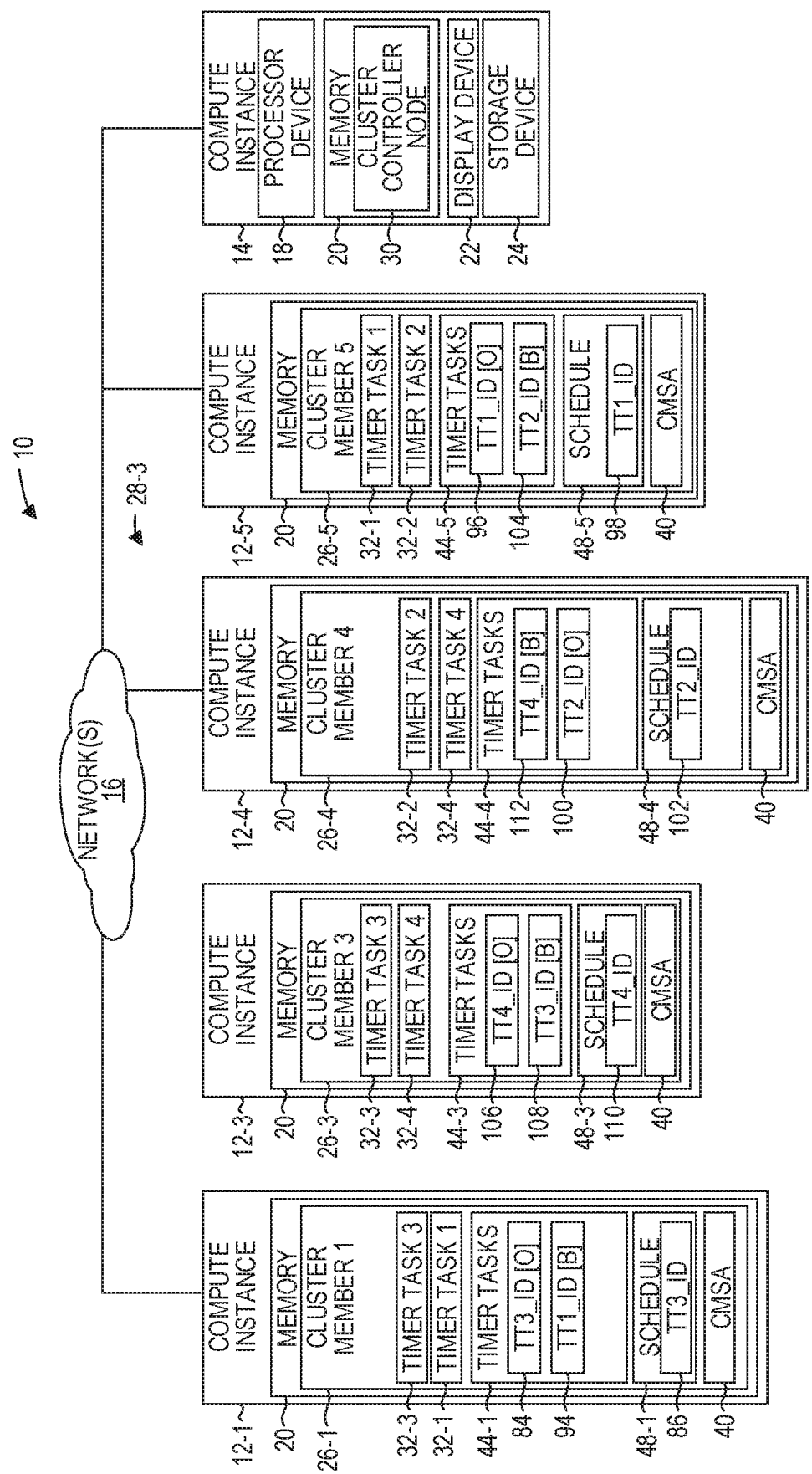

Referring now to FIG. 3D, a new cluster member 26-5, executing on a compute instance 12-5, has joined the cluster 28-2, resulting in a cluster 28-3 that includes the cluster members 26-1, 26-3-26-5. Upon the change in cluster membership, the respective cluster members 26-1, 26-3 and 26-4 reevaluate the cluster member owner and the cluster member backup for each timer task 32 for which the respective cluster members 26-1, 26-3 and 26-4 are cluster member owners or cluster member backups, substantially similarly as discussed above with regard to FIGS. 3B-3C. For purposes of brevity the redistribution of timer tasks 32-1-32-4, with respect to the cluster members 26-1, 26-3 and 26-4 will not be discussed in detail herein, but the result of the redistribution of timer tasks 32-1-32-4 is as illustrated in FIG. 3D. In particular, the cluster member 26-1 remains the cluster member owner of the timer task 32-3 and remains the cluster member backup of the timer task 32-1. The new cluster member owner for the timer task 32-1 is the cluster member 26-5, and thus the cluster member 26-1 sends the timer task 32-1 to the cluster member 26-5. The cluster member 26-5 receives the timer task 32-1, and processes the timer task 32-1 in a manner similar to that discussed above with regard to FIGS. 3B-3C, resulting in an entry 96 in a timer task list 44-5, and an entry 98 in a schedule 48-5 that schedules the timer task 32-1 for execution by the cluster member 26-5 in accordance with the corresponding schedule.

The cluster member 26-3 determines that the new cluster member owner of the timer task 32-2 is the cluster member 26-4 and the new cluster member backup of the timer task 32-2 is the new cluster member 26-5. The cluster member 26-3 unschedules the timer task 32-2 for execution by the cluster member 26-3. The cluster member 26-3 sends the timer task 32-2 to the cluster members 26-4 and 26-5. The cluster member 26-4 processes the timer task 32-2 as the new cluster member owner of the timer task 32-2, resulting in an entry 100 in the timer task list 44-4 and a schedule entry 102 in the schedule 48-4. The cluster member 26-5 processes the timer task 32-2 as the new cluster member backup of the timer task 32-2, resulting in an entry 104 in the timer task list 44-5.

The cluster member 26-3 is now the cluster member owner of the timer task 32-4 and the cluster member backup of the timer task 32-3, as reflected by the new entries 106 and 108 in the timer task list 44-3. The cluster member 26-3 schedules the timer task 32-4 for execution by the cluster member 26-3 in accordance with the corresponding schedule, as reflected by an entry 110 in the schedule 48-3. The cluster member 26-3 receives the timer task 32-3 from the cluster members 26-1 and 26-4 as the former cluster member owner and cluster member backup of the timer task 32-3.

The cluster member 26-4 transfers the timer task 32-1 to the cluster member 26-1 as new cluster member backup and to the cluster member 26-5 as new cluster member owner. The cluster member 26-4 is now the cluster member owner of the timer task 32-2 and the cluster member backup of the timer task 32-4, as reflected by the new entries 100 and 112 in the timer task list 44-4. The cluster member 26-4 unschedules the timer tasks 32-1 and 32-4 for execution.

Figure 4A:
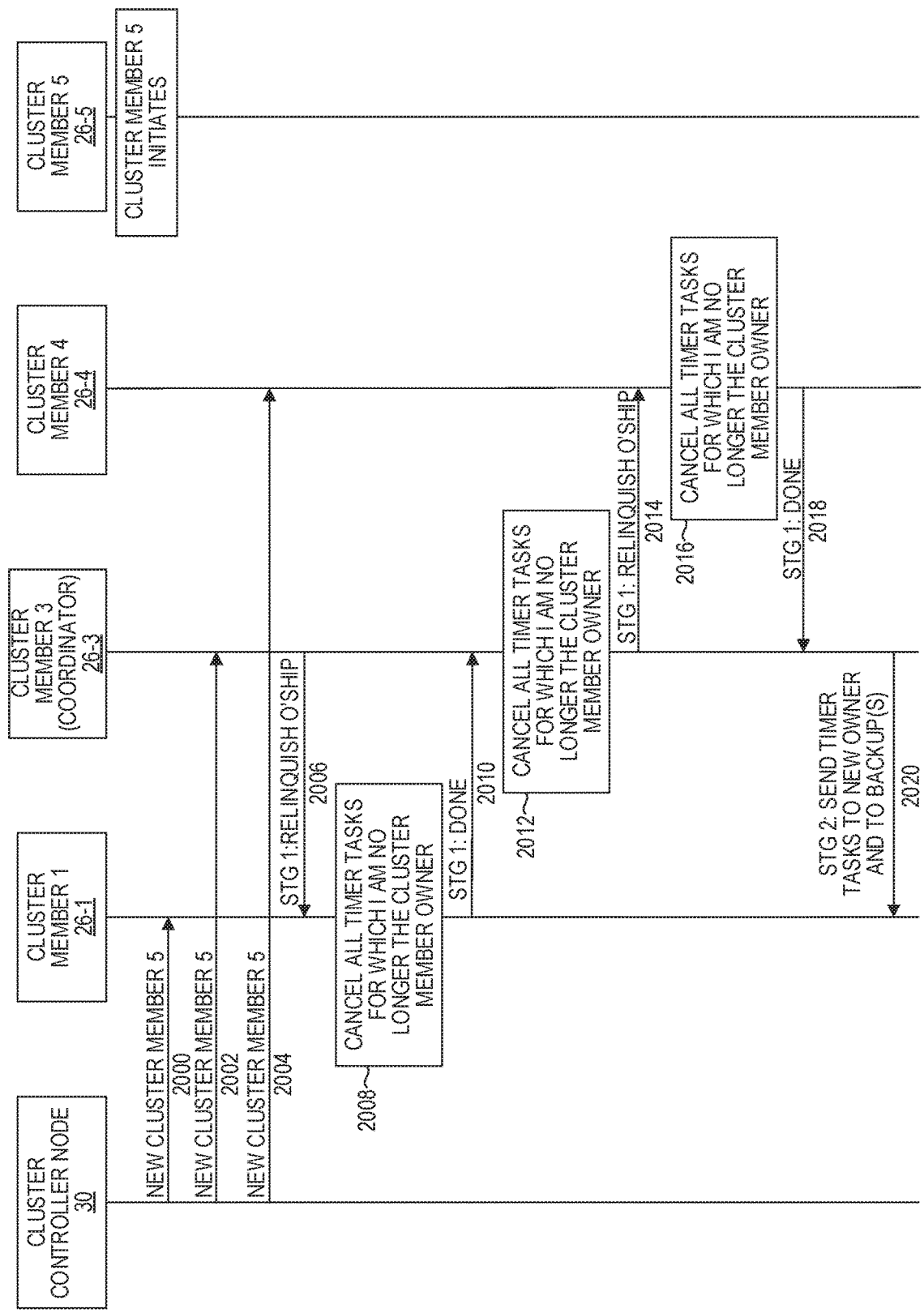
Figure 4B:
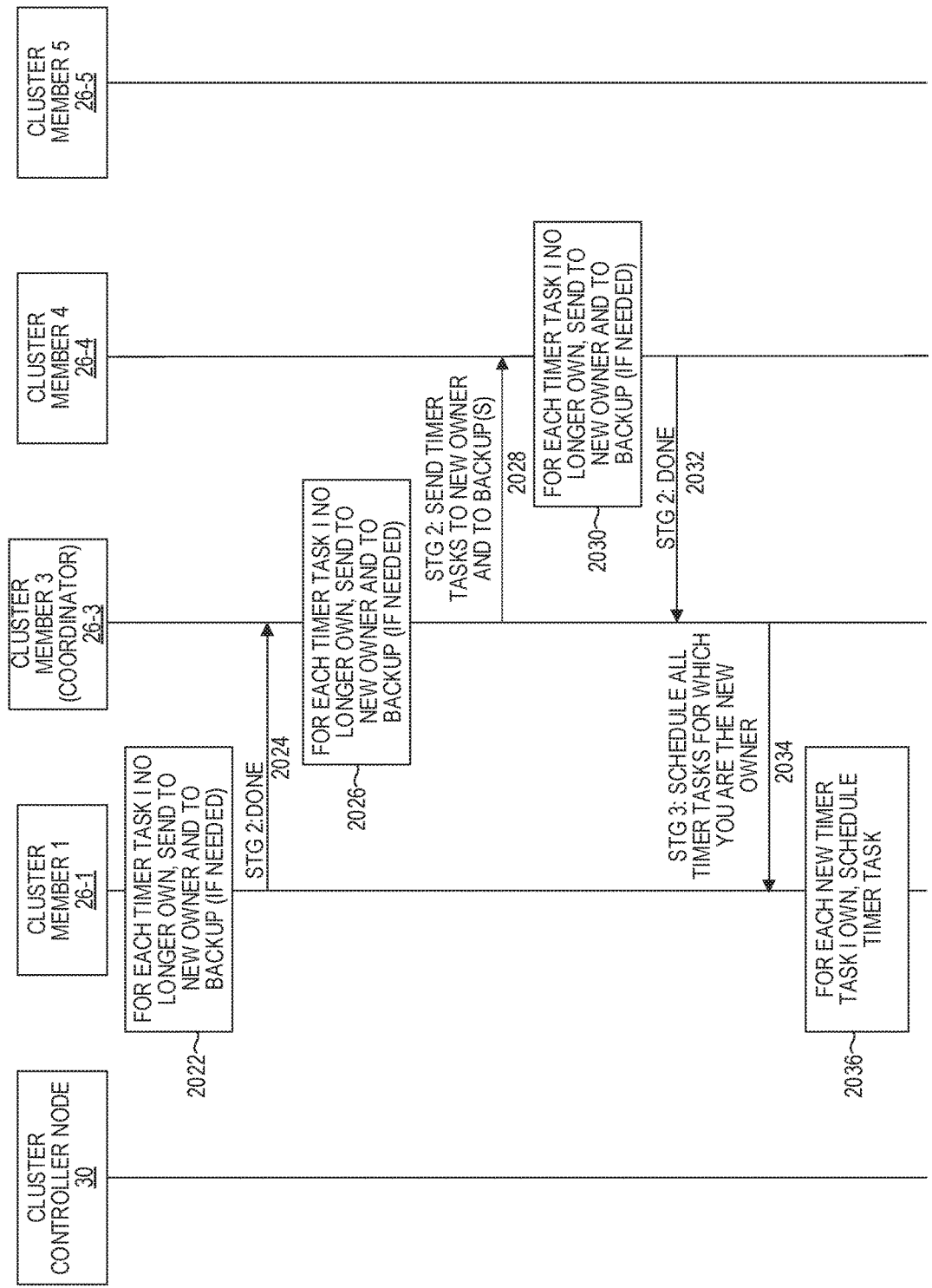
Figure 4C:
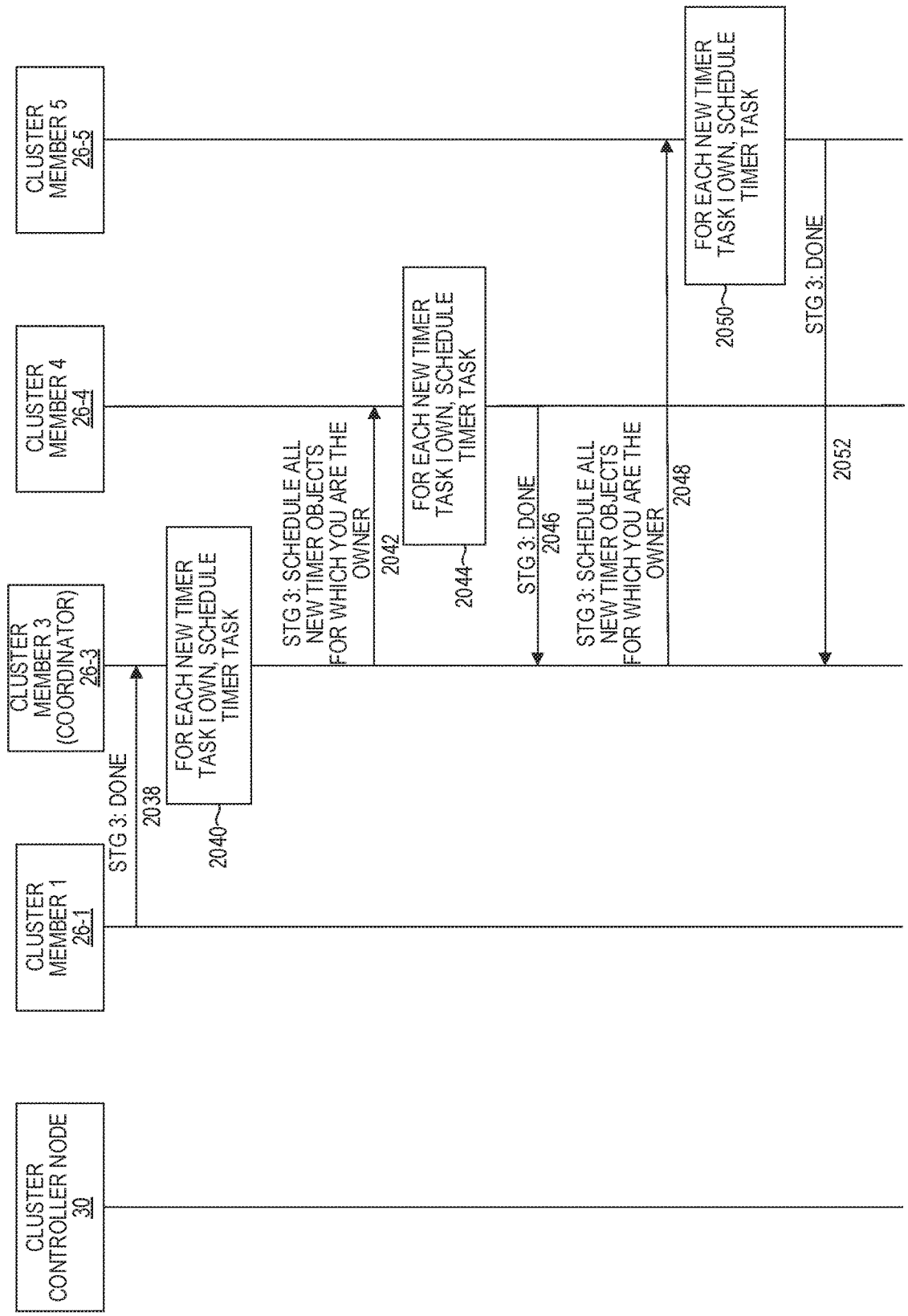

FIGS. 4A-4C are message flow diagrams illustrating a sequence for redistribution of timer tasks 32-1-32-4 after a change of cluster membership according to one implementation. In this example, the cluster member 26-5 has just joined the cluster 28-2 illustrated in FIG. 3C to form the cluster 28-3 described above with regard to FIG. 3D. Thus, FIGS. 4A-4C will be discussed in conjunction with FIGS. 3C and 3D. In this implementation, one of the cluster members 26-1, 26-3-26-5 has a role as a coordinator for timer task redistribution upon a change in cluster membership. This role may be assigned in any desired manner, such as to the oldest cluster member 26-1, 26-3-26-5, or arbitrarily by the cluster controller node 30. In this example, the cluster member 26-3 is the coordinator; however, the sequence described herein would be the same regardless of which cluster member 26-1, 26-3-26-5 is the coordinator.

Upon the addition of the cluster member 26-5, the cluster controller node 30 notifies the existing cluster members 26-1, 26-3 and 26-4 that a new cluster member has been added to the cluster (blocks 2000, 2002, 2004). The cluster member 26-3, as coordinator, now starts a sequenced process in three stages for timer task redistribution. In stage one, the cluster member 26-3 sends a relinquish ownership message to each cluster member 26 to cancel (i.e., unschedule) any timer tasks 32 for which the cluster member 26 was previously the cluster member owner but for which the cluster member 26 will no longer be the cluster member owner. The particular order of cluster members 26 in this sequence is not important. As an example, the cluster member 26-3 first sends the relinquish ownership message to the cluster member 26-1 (block 2006). In response, the cluster member 26-1, for each timer task 32 for which the cluster member 26-1 was the cluster member owner but is no longer the cluster member owner due to the change in cluster membership, cancels the respective timer task(s) 32 for execution by the cluster member 26-1 (block 2008). The cluster member 26-1 sends a message to the cluster member 26-3 indicating the cluster member 26-1 has completed stage one (block 2010). The cluster member 26-3 then performs stage one processing itself and cancels any timer tasks 32 for which the cluster member 26-3 was the cluster member owner but is no longer the cluster member owner (block 2012). The cluster member 26-3 then sends the relinquish ownership message to the cluster member 26-4 (block 2014). The cluster member 26-4 performs stage one processing and cancels any timer tasks 32 for which the cluster member 26-4 was the cluster member owner but is no longer the cluster member owner (block 2016). The cluster member 26-4 sends a message to the cluster member 26-3 indicating the cluster member 26-4 has completed stage one processing (block 2018).

The cluster member 26-3 now starts stage two processing. The cluster member 26-3 sends a distribute timer tasks message to the cluster member 26-1 directing the cluster member 26-1 to, for each timer task 32 for which the cluster member 26-1 was previously the cluster member owner, but is no longer the cluster member owner, to transfer the timer task to the new cluster member owner and the new cluster member backup (block, 2020). As discussed above, if the new cluster member owner and/or cluster member backup already had the respective timer task 32, then in some implementations the cluster member 26-1 need not send the timer task 32 to the new cluster member owner and/or cluster member backup.

The cluster member 26-1 transfers such timer tasks 32 to any new cluster member owners and cluster member backups, and then sends a message to the cluster member 26-3 indicating the cluster member 26-1 has completed stage two processing (blocks 2022, 2024). The cluster member 26-3 then performs stage two processing (block 2026). The cluster member 26-3 sends a distribute timer tasks message to the cluster member 26-4 (block 2028). The cluster member 26-4 then performs stage two processing, and when finished, sends a message to the cluster member 26-3 indicating the cluster member 26-4 has completed stage two processing (blocks 2030, 2032).

The cluster member 26-3 now starts stage three processing. The cluster member 26-3 sends a schedule new timer tasks message to the cluster member 26-1 directing the cluster member 26-1 to, for each timer task 32 for which the cluster member 26-1 is now the new cluster member owner, schedule such timer task(s) 32 for execution by the cluster member 26-1 in accordance with the corresponding schedule (block 2034). The cluster member 26-1 then schedules each timer task 32 for which the cluster member 26-1 is now the new cluster member owner for execution by the cluster member 26-1 in accordance with the corresponding schedule (block 2036). The cluster member 26-1 sends a message to the cluster member 26-3 indicating the cluster member 26-1 has completed stage three processing (block 2038).

The cluster member 26-3 then performs stage three processing (block 2040). The cluster member 26-3 sends a schedule new timer tasks message to the cluster member 26-4 (block 2042). The cluster member 26-4 performs stage three processing, and when finished, sends a message to the cluster member 26-3 indicating the cluster member 26-4 has completed stage three processing (blocks 2044, 2046). The cluster member 26-3 then sends a schedule new timer tasks message to the new cluster member 26-5 (block 2048). The new cluster member 26-5 performs stage three processing for each of the timer tasks 32 received by the new cluster member 26-5, and for which the new cluster member 26-5 is the cluster member owner (block 2050). When finished, new cluster member 26-5 sends a message to the cluster member 26-3 indicating the cluster member 26-5 has completed stage three processing (block 2052).

FIG. 5 is a message flow diagram illustrating a sequence for redistribution of timer tasks 32 after a change of cluster membership wherein an existing cluster member leaves a cluster according to one implementation. In this example, assume that the cluster member 26-5 illustrated in FIG. 4C subsequently terminates. The cluster controller node 30 notifies the existing cluster members 26-1, 26-3 and 26-4 that the cluster member 26-5 has left the cluster (blocks 3000, 3002, 3004). The cluster member 26-3, as coordinator, now starts a sequenced process in three stages for timer task redistribution. The first stage of processing is identical to that described with respect to FIGS. 4A-4C, and for the sake of brevity, an explanation of such processing will not be repeated (block 3006). After the cluster members 26-1, 26-3 and 26-4 have finished stage one processing, the cluster member 26-3 sends a distribute timer tasks message to the cluster member 26-1 (block 3008). The cluster member 26-3 repeats the stage two processing discussed above with regard to FIGS. 4A and 4B (block 3010). However, in this situation, the cluster member 26-3 also determines whether the cluster member 26-3 was a backup cluster member for any timer task(s) 32 for which the cluster member 26-5 was previously the cluster member owner. For each such timer task(s) 32, the cluster member 26-1 determines the new cluster member owner and the new cluster member backup, and distributes the timer task(s) 32 accordingly (block 3012). The cluster members 26-3 and 26-4 then sequentially perform the same stage two processing as discussed above with regard to the cluster member 26-1 (block 3014). After stage two processing has completed, the cluster members 26-1, 26-3 and 26-4 perform stage three processing as described above with respect to FIGS. 4A-4C, and for the sake of brevity, such processing will not be repeated (block 3016).

Figure 6:
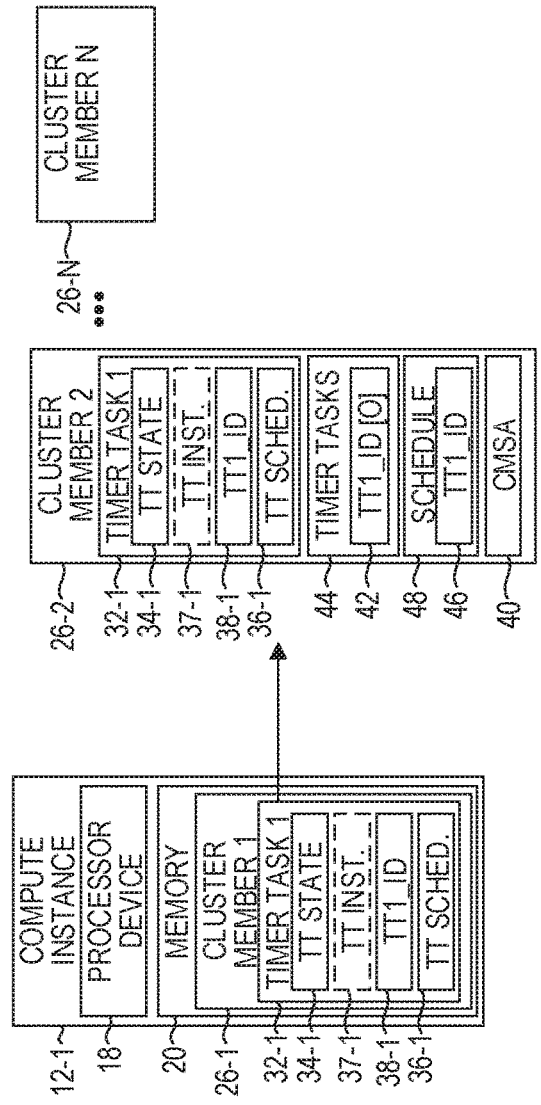

FIG. 6 is a simplified block diagram of the system 10 illustrated in FIGS. 1A-1B according to one example. In this example, the compute instance 12-1 comprises a computing device that includes the memory 20 and the processor device 18 coupled to the memory 20. The processor device 18 is to generate, by the cluster member 26-1 executing on the computing device, the timer task 32-1 that can be executed on any cluster member 26-1-26-N of the plurality of cluster members 26-1-26-N that compose the cluster 28. The processor device 18 is further to send the timer task 32-1 and the timer task schedule 36-1 that identifies at least one future point in time for executing the timer task 32-1 to the cluster member 26-2 of the plurality of cluster members 26-1-26-N.

Figure 7:
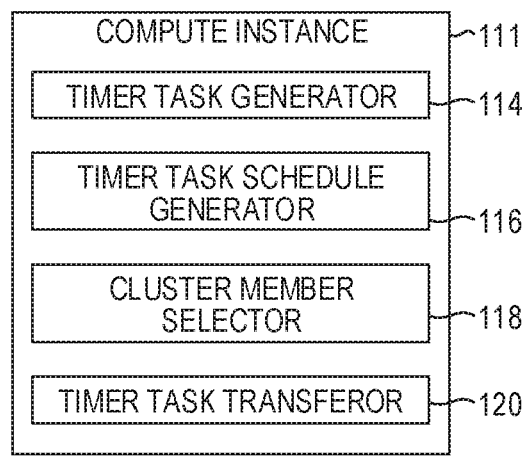

FIG. 7 is a block diagram of a compute instance 111 suitable for implementing aspects disclosed herein according to one implementation. As discussed above, the compute instance 111 can comprise, for example, a computing device or a virtual machine. The compute instance 111 includes a timer task generator 114 that is configured to generate, by a cluster member, a timer task that can be executed on any cluster member of a plurality of cluster members that compose a cluster. The timer task generator 114 may comprise executable software instructions configured to program a processor device to implement the functionality of generating a timer task, may comprise circuitry including, by way of non-limiting example, an application-specific integrated circuit (ASIC), field-programmable gate array (FPGA), or may comprise a combination of executable software instructions and circuitry.

The compute instance 111 also includes a timer task schedule generator 116 that is configured to generate a timer task schedule that identifies at least one future point in time for executing the timer task. The timer task schedule generator 116 may comprise executable software instructions configured to program a processor device to implement the functionality of generating a timer task schedule, may comprise circuitry including, by way of non-limiting example, an application-specific integrated circuit (ASIC), field-programmable gate array (FPGA), or may comprise a combination of executable software instructions and circuitry.

The compute instance 111 also includes a cluster member selector 118 that is configured to select a cluster member of the plurality of cluster members as a cluster member owner that is to schedule the timer task and execute the timer task at the at least one future point in time. The cluster member selector 118 may comprise executable software instructions configured to program a processor device to implement the functionality of selecting a cluster member owner for a timer task, may comprise circuitry including, by way of non-limiting example, an application-specific integrated circuit (ASIC), field-programmable gate array (FPGA), or may comprise a combination of executable software instructions and circuitry.

The compute instance 111 also includes a timer task transferor 120 that is configured to transfer the timer task and the schedule to the cluster member. The timer task transferor 120 may comprise executable software instructions configured to program a processor device to implement the functionality of transferring a timer task, may comprise circuitry including, by way of non-limiting example, an application-specific integrated circuit (ASIC), field-programmable gate array (FPGA), or may comprise a combination of executable software instructions and circuitry.

Figure 8:
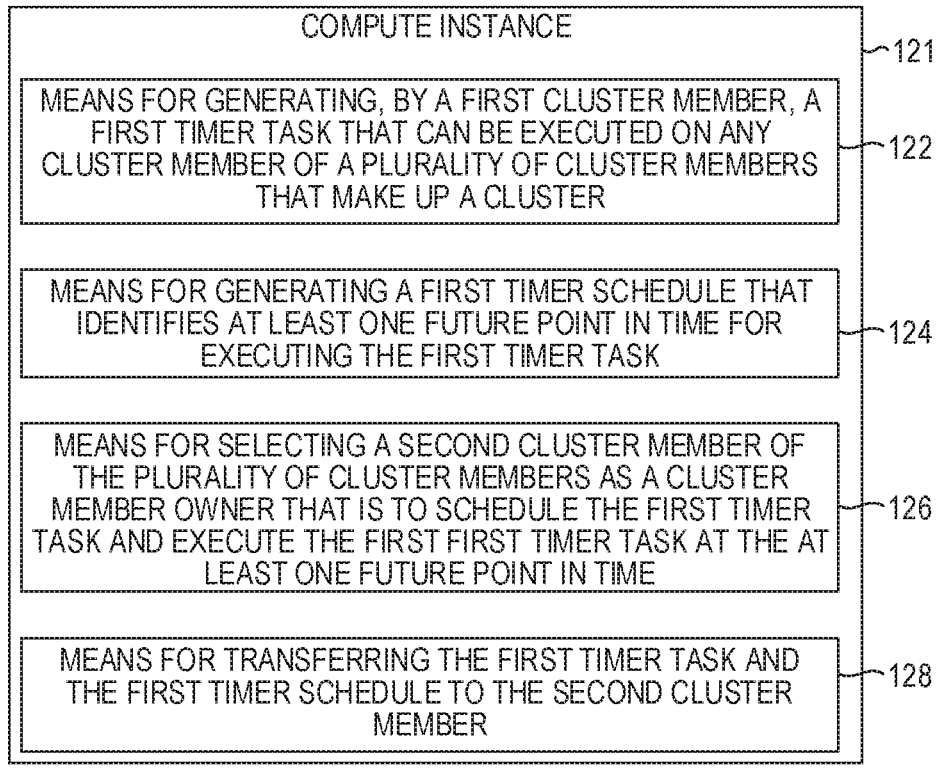

FIG. 8 is a block diagram of a compute instance 121 according to additional implementations. As discussed above, the compute instance 121 can comprise, for example, a computing device or a virtual machine. In this implementation, the compute instance 121 includes a means 122 for generating, by a cluster member, a timer task that can be executed on any cluster member of a plurality of cluster members that compose a cluster. The means 122 may be implemented in any number of manners, including, for example, via the timer task generator 114 illustrated in FIG. 7.

The compute instance 121 includes a means 124 for generating a timer schedule that identifies at least one future point in time for executing the timer task. The means 124 may be implemented in any number of manners, including, for example, via the timer task schedule generator 116 illustrated in FIG. 7. The compute instance 121 includes a means 126 for selecting a cluster member of the plurality of cluster members as a cluster member owner that is to schedule the timer task and execute the timer task at the at least one future point in time. The means 126 may be implemented in any number of manners, including, for example, via the cluster member selector 118 illustrated in FIG. 7, and/or the CMSA 40 discussed above. The compute instance 121 includes a means 128 for transferring the timer task and the timer schedule to the cluster member. The means 128 may be implemented in any number of manners, including, for example, via the timer task transferor 120 illustrated in FIG. 7.

Figure 9:
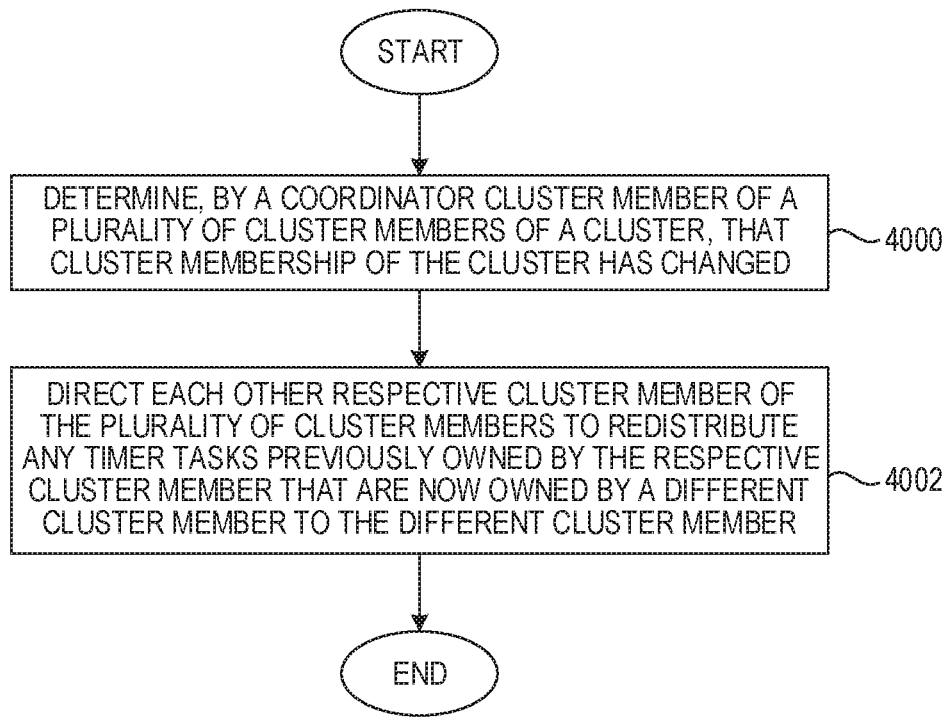

FIG. 9 is flowchart of a method for coordinating timer task redistribution among a plurality of cluster members upon a change in cluster membership according to one implementation. A coordinator cluster member 26-1-26-N of the plurality of cluster members 26-1-26-N of a cluster determines that cluster membership of the cluster has changed (block 4000). The coordinator cluster member 26-1-26-N directs each other respective cluster member 26-1-26-N of the plurality of cluster members 26-1-26-N to redistribute any timer tasks 32 previously owned by the respective cluster member 26-1-26-N that are now owned by a different cluster member 26-1-26-N to the different cluster member 26-1-26-N (block 4002).

Figure 10:
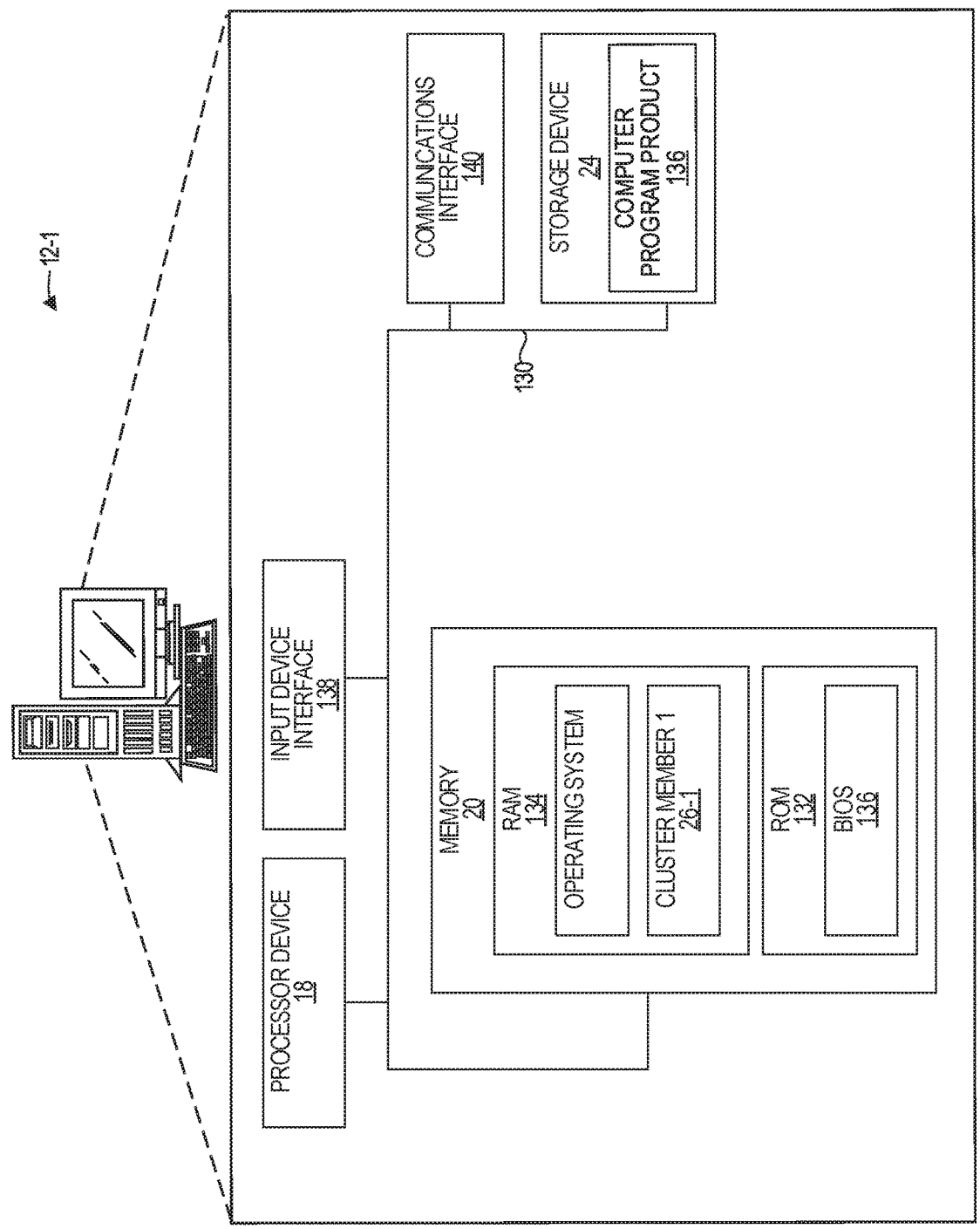

FIG. 10 is a block diagram of the compute instance 12-1 suitable for implementing examples according to one example. The compute instance 12-1 may comprise any computing or electronic device capable of including firmware, hardware, and/or executing software instructions to implement the functionality described herein, such as a computer server, a desktop computing device, a laptop computing device, a virtual machine, or the like. The compute instance 12-1 includes the processor device 18, the memory 20, and a system bus 130. The system bus 130 provides an interface for system components including, but not limited to, the memory 20 and the processor device 18. The processor device 18 can be any commercially available or proprietary processor.

The system bus 130 may be any of several types of bus structures that may further interconnect to a memory bus (with or without a memory controller), a peripheral bus, and/or a local bus using any of a variety of commercially available bus architectures. The memory 20 may include non-volatile memory 132 (e.g., read-only memory (ROM), erasable programmable read-only memory (EPROM), electrically erasable programmable read-only memory (EEPROM), etc.), and volatile memory 134 (e.g., random-access memory (RAM)). A basic input/output system (BIOS) 136 may be stored in the non-volatile memory 132 and can include the basic routines that help to transfer information between elements within the compute instance 12-1. The volatile memory 134 may also include a high-speed RAM, such as static RAM, for caching data.

The compute instance 12-1 may further include or be coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 24 and in the volatile memory 134, including an operating system and one or more program modules, such as the cluster member 26-1, which may implement the functionality described herein in whole or in part.

All or a portion of the examples may be implemented as a computer program product 136 stored on a transitory or non-transitory computer-usable or computer-readable storage medium, such as the storage device 24, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the cluster member 26-1 in the volatile memory 134, may serve as a controller, or control system, for the compute instance 12-1 that is to implement the functionality described herein.

An operator may also be able to enter one or more configuration commands through a keyboard (not illustrated), a pointing device such as a mouse (not illustrated), or a touch-sensitive surface such as the display device 22. Such input devices may be connected to the processor device 18 through an input device interface 138 that is coupled to the system bus 130 but can be connected by other interfaces such as a parallel port, an Institute of Electrical and Electronic Engineers (IEEE) 1394 serial port, a Universal Serial Bus (USB) port, an IR interface, and the like.

The compute instance 12-1 may also include a communications interface 140 suitable for communicating with the network 16 as appropriate or desired.

Other computer system designs and configurations may also be suitable to implement the systems and methods described herein. The following examples illustrate various additional implementations in accordance with one or more aspects of the disclosure.

Example 1 is a computing device that includes a timer task generator to generate, by a first cluster member, of a plurality of cluster members that compose a cluster, executing on the computing device comprising a processor device, a first timer task that can be executed on any cluster member of the plurality of cluster members; a timer task schedule generator to generate a first timer task schedule that identifies at least one future point in time for executing the first timer task; a cluster member selector to select a second cluster member of the plurality of cluster members as a cluster member owner that is to schedule the first timer task and execute the first timer task at the at least one future point in time; and a timer task transferor to transfer the first timer task and the first timer task schedule to the second cluster member.

Example 2 is a computing device that includes a means for generating, by a first cluster member, of a plurality of cluster members that compose a cluster, executing on the computing device comprising a processor device, a first timer task that can be executed on any cluster member of the plurality of cluster members; a means for generating a first timer task schedule that identifies at least one future point in time for executing the first timer task; a means for selecting a second cluster member of the plurality of cluster members as a cluster member owner that is to schedule the first timer task and execute the first timer task at the at least one future point in time; and a means for transferring the first timer task and the first timer task schedule to the second cluster member.

Example 3 is a system that includes a cluster comprising a plurality of cluster members, the cluster comprising: a first computing device comprising a first cluster member; and a second computing device comprising a second cluster member; wherein the first cluster member is to: generate a first timer task that can be executed on the second cluster member of the plurality of cluster members that compose the cluster; and send the first timer task and a first timer task schedule that identifies at least one future point in time for executing the first timer task to the second cluster member.

Example 4 is the system of example 3 wherein the second cluster member is to: receive the first timer task and the first timer task schedule; and schedule the first timer task to execute in accordance with the first timer task schedule.

Example 5 is the system of example 3 wherein the second cluster member is to: generate a second timer task that can be executed on the first cluster member; and send the second timer task and a second timer task schedule that identifies at least one future point in time for executing the second timer task to the first cluster member.

Example 6 is the system of example 5 wherein the first cluster member is to: receive the second timer task and the second timer task schedule; and schedule the second timer task to execute in accordance with the second timer task schedule.

Example 7 is the system of example 3 wherein the first cluster member is to: generate a second timer task that can be executed on the second cluster member; and send the second timer task and a second timer task schedule that identifies at least one future point in time for executing the second timer task to the second cluster member.

Example 8 is the system of example 7 wherein the second cluster member is to: receive the second timer task; determine that the second cluster member is a backup owner of the second timer task; in response to determining that the second cluster member is the backup owner of the second timer task, not schedule the second timer task to execute in accordance with the second timer task schedule.

Example 9 is the system of example 8 wherein to determine that the second cluster member is the backup owner of the second timer task the second cluster member is to: access a second timer task identifier (ID) that uniquely identifies the second timer task; process the second timer task ID with a selection mechanism; determine, based on an output of the selection mechanism, that the second cluster member is the backup owner of the second timer task.

Example 10 is the system of example 3 wherein the first computing device and the second computing device are a same computing device.

Example 11 is a method comprising: determining, by a coordinator cluster member of a plurality of cluster members of a cluster, that cluster membership of the cluster has changed; directing each other respective cluster member of the plurality of cluster members to redistribute any timer tasks previously owned by the respective cluster member that are now owned by a different cluster member to the different cluster member.

Example 12 is the method of example 11 wherein directing each other respective cluster member of the plurality of cluster members to redistribute any timer tasks previously owned by the respective cluster member that are now owned by a different cluster member to the different cluster member further comprises: in a first redistribution stage of three redistribution stages, directing each of the other cluster members of the plurality of cluster members to cancel any timer tasks that the respective cluster members previously owned but which are now owned by a different cluster member.

Example 13 is the method of example 12 further comprising in a second redistribution stage of the three redistribution stages, directing each of the other cluster members of the plurality of cluster members to send any timer tasks that the respective cluster members previously owned but which are now owned by a different cluster member to the different cluster member.

Example 14 is the method of example 13 further comprising in a third redistribution stage of the three redistribution stages, directing each of the other cluster members of the plurality of cluster members to schedule for execution any timer tasks that the respective cluster members now own but did not previously own.

Example 15 is the method of example 14 wherein the second redistribution stage of the three redistribution stages occurs only after each other cluster member has indicated that the other cluster member has completed the first redistribution stage.

Example 16 is the method of example 12 further comprising: in the first redistribution stage of the three redistribution stages, determining, by the coordinator cluster member, that a timer task previously owned by the coordinator cluster member is now owned by the coordinator cluster member.

Individuals will recognize improvements and modifications to the preferred examples of the disclosure. All such improvements and modifications are considered within the scope of the concepts disclosed herein and the claims that follow.

What is claimed is:

1. A method comprising:
    generating, by a first cluster member executing on a computing device comprising a processor device, a first timer task that can be executed on any cluster member of a plurality of cluster members including the first cluster member that compose a cluster;
    generating, by the first cluster member, a first timer task schedule that identifies at least one future point in time at which the first timer task is to be executed;
    selecting, by the first cluster member via a cluster member selection algorithm, a second cluster member of the plurality of cluster members as a cluster member owner for the first timer task that is to schedule the first timer task and to execute the first timer task at the at least one future point in time;
    transferring, by the first cluster member, the first timer task and the first timer task schedule to the second cluster member;
    scheduling, by the second cluster member, the first timer task for execution by the second cluster member in accordance with the first timer task schedule;
    subsequently determining, by the second cluster member, that a change in cluster membership has occurred;
    in response to the change in cluster membership, determining, by the second cluster member via the cluster member selection algorithm, that the second cluster member is no longer the cluster member owner for the first timer task and that another cluster member is now the cluster member owner for the first timer task; and
    cancelling, by the second cluster member, execution by the second cluster member of the first timer task.

2. The method of claim 1 wherein selecting the second cluster member comprises randomly selecting the second cluster member of the plurality of cluster members.

3. The method of claim 1 wherein selecting the second cluster member comprises:
    obtaining a first timer task identifier (ID) that uniquely identifies the first timer task;
    processing the first timer task ID with a hash function that is configured to perform a hashing operation on a received timer task unique ID and output a value that corresponds to a cluster member of the plurality of cluster members; and
    selecting the second cluster member based on the value received from the hash function, the value corresponding to the second cluster member.

4. The method of claim 1 further comprising:
    selecting a third cluster member of the plurality of cluster members as a cluster member backup that is not to schedule the first timer task for execution, the third cluster member being a different cluster member than the first cluster member and the second cluster member; and
    sending the first timer task and the first timer task schedule to the third cluster member.

5. The method of claim 1 further comprising:
    receiving, by the first cluster member from another cluster member of the plurality of cluster members, a second timer task and a second timer task schedule that identifies at least one future point in time at which the second timer task is to be executed;
    determining, by the first cluster member that the first cluster member is an owner of the second timer task;
    scheduling, by the first cluster member, the second timer task to be executed by the first cluster member in accordance with the second timer task schedule; and
    storing, by the first cluster member, a second timer task ID that uniquely identifies the second timer task.

6. The method of claim 5 further comprising:
    receiving, by the first cluster member from another cluster member of the plurality of cluster members, a third timer task and a third timer task schedule that identifies at least one future point in time at which the third timer task is to be executed;
    determining, by the first cluster member that the first cluster member is a cluster member backup for the third timer task; and
    in response to determining that the first cluster member is the cluster member backup for the third timer task, not scheduling, by the first cluster member, the third timer task to be executed by the first cluster member in accordance with the third timer task schedule.

7. The method of claim 1 further comprising:
    determining, by the first cluster member, that a change in cluster membership has occurred;

in response to determining that the change in cluster membership has occurred, accessing, by the first cluster member, a second timer task ID that uniquely identifies a second timer task for which the first cluster member was a cluster member owner prior to the change in cluster membership;

reevaluating, by the first cluster member, ownership of the second timer task;

determining, by the first cluster member, that a different cluster member is now the cluster member owner for the second timer task;

unscheduling, by the first cluster member, the second timer task so that the second timer task will not be executed by the first cluster member; and sending, by the first cluster member, the second timer task and a second timer task schedule associated with the second timer task to the different cluster member.

8. The method of claim 7 wherein reevaluating the ownership of the second timer task comprises determining, via the cluster member selection algorithm, that the different cluster member is now the cluster member owner for the second timer task.

9. The method of claim 7 wherein determining, by the first cluster member, that the change in cluster membership has occurred comprises determining that a new cluster member has joined the cluster.

10. The method of claim 7 wherein determining, by the first cluster member, that the change in cluster membership has occurred comprises determining that a cluster member of the plurality of cluster members has left the cluster.

11. The method of claim 1 further comprising:
determining, by the first cluster member, that a change in cluster membership has occurred;

in response to determining that the change in cluster membership has occurred, accessing, by the first cluster member, a second timer task ID that uniquely identifies a second timer task for which the first cluster member was a cluster member owner prior to the change in cluster membership;

reevaluating, by the first cluster member, ownership of the second timer task;

determining, by the first cluster member, that a different cluster member is now the cluster member owner for the second timer task;

unscheduling, by the first cluster member, the second timer task so that the second timer task will not be executed by the first cluster member;

determining, by the first cluster member, that the different cluster member, prior to the change in cluster membership, was a cluster member backup for the second timer task; and in response to determining that the different cluster member was the cluster member backup for the second timer task, not sending the second timer task to the different cluster member.

12. The method of claim 1 further comprising:
determining, by the first cluster member, that a change in cluster membership has occurred;

in response to determining that the change in cluster membership has occurred, accessing, by the first cluster member, a second timer task ID that uniquely identifies a second timer task for which the first cluster member was a cluster member backup prior to the change in cluster membership;

reevaluating, by the first cluster member, ownership of the second timer task;

determining, by the first cluster member, that the first cluster member is now the cluster member owner for the second timer task; and scheduling, by the first cluster member, the second timer task to be executed by the first cluster member in accordance with a second timer task schedule that identifies at least one future point in time at which the second timer task is to be executed.

13. The method of claim 1, further comprising:
joining, by a new cluster member, the plurality of cluster members that compose the cluster;

in response to joining the plurality of cluster members that compose the cluster, receiving, from another cluster member of the cluster, a second timer task and a second timer task schedule that identifies at least one future point in time at which the second timer task is to be executed, the new cluster member being a cluster member owner for the second timer task; and scheduling, by the new cluster member, the second timer task to be executed by the new cluster member in accordance with the second timer task schedule.

14. The method of claim 1 wherein the first timer task comprises a Java bean and the first cluster member comprises an enterprise Java bean container.

15. A computing device comprising:
a memory; and
a processor device coupled to the memory, the processor device to:
generate, by a first cluster member executing on the computing device, a first timer task that can be executed on any cluster member of a plurality of cluster members that compose a cluster;

generate, by the first cluster member, a first timer task schedule that identifies at least one future point in time at which the first timer task is to be executed;

select, by the first cluster member via a cluster member selection algorithm, a second cluster member of the plurality of cluster members as a cluster member owner for the first timer task that is to schedule the first timer task and to execute the first timer task at the at least one future point in time;

transfer, by the first cluster member, the first timer task and the first timer task schedule to the second cluster member;

schedule, by the second cluster member, the first timer task for execution by the second cluster member in accordance with the first timer task schedule;

subsequently determine, by the second cluster member, that a change in cluster membership has occurred;

in response to the change in cluster membership, determine, by the second cluster member via the cluster member selection algorithm, that the second cluster member is no longer the cluster member owner for the first timer task and that another cluster member is now the cluster member owner for the first timer task; and cancel, by the second cluster member, execution by the second cluster member of the first timer task.

16. The computing device of claim 15 wherein the processor device is further to select the second cluster member of the plurality of cluster members as the cluster member owner for the first timer task that is to schedule the first timer task and to execute the first timer task at the at least one future point in time by:
obtaining a first timer task identifier (ID) that uniquely identifies the first timer task; and processing the first timer task ID with a hash function that outputs a hash value that is based on the first timer task ID, the hash value corresponding to a particular cluster member of the plurality of cluster members; and wherein the hash value corresponds to the second cluster member.

17. The computing device of claim 16 wherein the processor device is further to:

determine, by the first cluster member, that the membership of the cluster has changed;

in response to determining that membership of the cluster has changed, access, by the first cluster member, the first timer task ID;

determine, by the first cluster member, based on the first timer task ID, that the first cluster member has now, due to the change in the membership of the cluster, become the cluster member owner for the first timer task;

schedule, by the first cluster member, the first timer task to execute in accordance with the first timer task schedule; and store, by the first cluster member, the first timer task ID in association with information that identifies the first cluster member as being the cluster member owner for the first timer task.

18. A computer program product stored on one or more non-transitory computer-readable storage mediums and including instructions to cause one or more processor devices to:

generate, by a first cluster member, a first timer task that can be executed on any cluster member of a plurality of cluster members that compose a cluster;

generate, by the first cluster member, a first timer task schedule that identifies at least one future point in time at which the first timer task is to be executed;

select, by the first cluster member via a cluster member selection algorithm, a second cluster member of the plurality of cluster members as a cluster member owner for the first timer task that is to schedule the first timer task and to execute the first timer task at the at least one future point in time;

transfer, by the first cluster member, the first timer task and the first timer task schedule to the second cluster member;

schedule, by the second cluster member, the first timer task for execution by the second cluster member in accordance with the first timer task schedule;

subsequently determine, by the second cluster member, that a change in cluster membership has occurred;

in response to the change in cluster membership, determine, by the second cluster member via the cluster member selection algorithm, that the second cluster member is no longer the cluster member owner for the first timer task and that another cluster member is now the cluster member owner for the first timer task; and cancel, by the second cluster member, execution by the second cluster member of the first timer task.

* * * * *